US010376747B2

(12) United States Patent
Ricci et al.

(10) Patent No.: US 10,376,747 B2
(45) Date of Patent: *Aug. 13, 2019

(54) GOLF BALLS HAVING A CORE WITH SURROUNDING INTERMEDIATE FOAM LAYER

(71) Applicant: Acushnet Company, Fairhaven, MA (US)

(72) Inventors: Shawn Ricci, New Bedford, MA (US); Michael Michalewich, Norton, MA (US); Brian Comeau, Berkley, MA (US); Michael J. Sullivan, Old Lyme, CT (US); Mark L. Binette, Mattapoisett, MA (US); Douglas S. Goguen, New Bedford, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/830,091

(22) Filed: Dec. 4, 2017

(65) Prior Publication Data

US 2018/0093140 A1     Apr. 5, 2018

Related U.S. Application Data

(63) Continuation-in-part of application No. 15/071,381, filed on Mar. 16, 2016, now Pat. No. 9,937,385.

(51) Int. Cl.
*A63B 37/04*  (2006.01)
*A63B 37/00*  (2006.01)
(Continued)

(52) U.S. Cl.
CPC ...... *A63B 37/0076* (2013.01); *A63B 37/0023* (2013.01); *A63B 37/0039* (2013.01); *A63B 37/0044* (2013.01); *A63B 37/0045* (2013.01); *A63B 37/0047* (2013.01); *A63B 37/0051* (2013.01); *A63B 37/0058* (2013.01); *A63B 37/0059* (2013.01); *A63B 37/0062* (2013.01);
(Continued)

(58) Field of Classification Search
USPC .................................................. 473/351–378
See application file for complete search history.

(56) References Cited

U.S. PATENT DOCUMENTS 4,836,552 A    6/1989 Pucket et al.
4,839,116 A    6/1989 Puckett et al.
(Continued)

FOREIGN PATENT DOCUMENTS

EP          0154735         9/1985

*Primary Examiner* — Alvin A Hunter
(74) *Attorney, Agent, or Firm* — Daniel W. Sullivan

(57) ABSTRACT

Multi-layered golf balls having a core, intermediate layer, and cover are provided. The ball includes a non-foamed inner core (center) made of a thermoplastic or thermoset composition such as polybutadiene rubber. An intermediate layer comprising a foamed composition, such as polyurethane foam, is disposed about the inner core. The foamed intermediate layer may have a specific gravity gradient within the layer, wherein the outer surface specific gravity is greater than the midpoint specific gravity. Ball constructions having two intermediate layers, wherein at least one layer is a foamed layer can be made. A cover having at least one layer is disposed about the intermediate layer.

19 Claims, 4 Drawing Sheets

(51) Int. Cl.
   *C08G 18/10* (2006.01)
   *C08G 18/48* (2006.01)
   *C08G 18/76* (2006.01)
   *C08G 18/22* (2006.01)
   *C08G 18/24* (2006.01)
   *C08G 18/40* (2006.01)
   *C08G 18/42* (2006.01)
   *C08G 101/00* (2006.01)

(52) U.S. Cl.
   CPC ...... *A63B 37/0063* (2013.01); *A63B 37/0064* (2013.01); *A63B 37/0066* (2013.01); *A63B 37/0075* (2013.01); *A63B 37/0091* (2013.01); *A63B 37/0092* (2013.01); *A63B 37/0094* (2013.01); *A63B 37/0096* (2013.01); *C08G 18/10* (2013.01); *C08G 18/222* (2013.01); *C08G 18/246* (2013.01); *C08G 18/4018* (2013.01); *C08G 18/4277* (2013.01); *C08G 18/4854* (2013.01); *C08G 18/7664* (2013.01); *C08G 18/7671* (2013.01); *C08G 2101/00* (2013.01); *C08G 2101/0083* (2013.01)

(56) References Cited

U.S. PATENT DOCUMENTS

| | | | |
|---|---|---|---|
| 5,104,126 A | 4/1992 | Gentiluomo | |
| 5,253,871 A | 10/1993 | Viollaz | |
| 5,439,227 A | 8/1995 | Egashira et al. | |
| 5,482,285 A | 1/1996 | Yabuki et al. | |
| 5,556,098 A | 9/1996 | Higuchi et al. | |
| 5,688,192 A | 11/1997 | Aoyama | |
| 5,688,595 A | 11/1997 | Yamagishi et al. | |
| 5,725,442 A | 3/1998 | Higuchi et al. | |
| 5,823,889 A | 10/1998 | Aoyama | |
| 5,833,553 A | 11/1998 | Sullivan et al. | |
| 6,057,403 A | 5/2000 | Sullivan et al. | |
| 6,213,895 B1 | 4/2001 | Sullivan et al. | |
| 6,245,859 B1 | 6/2001 | Sullivan et al. | |
| 6,386,992 B1 | 5/2002 | Harris et al. | |
| 6,390,935 B1 | 5/2002 | Sugimoto | |
| 6,431,999 B1 | 8/2002 | Nesbitt | |
| 6,494,795 B2 | 12/2002 | Sullivan | |
| 6,520,872 B2 | 2/2003 | Endo et al. | |
| 6,634,962 B2 | 10/2003 | Sullivan | |
| 6,688,991 B2 | 2/2004 | Sullivan et al. | |
| 6,692,380 B2 | 2/2004 | Sullivan et al. | |
| 6,743,123 B2 | 6/2004 | Sullivan | |
| 6,767,294 B2* | 7/2004 | Nesbitt | A63B 37/0003 473/351 |
| 6,852,042 B2 | 2/2005 | Sullivan et al. | |
| 6,939,249 B2 | 9/2005 | Sullivan | |
| 6,995,191 B2 | 2/2006 | Sullivan et al. | |
| 7,147,578 B2 | 12/2006 | Nesbitt et al. | |
| 7,160,208 B2 | 1/2007 | Watanabe | |
| 7,255,656 B2 | 8/2007 | Sullivan et al. | |
| 7,371,192 B2 | 5/2008 | Sullivan et al. | |
| 7,452,291 B2 | 11/2008 | Sullivan et al. | |
| 7,708,654 B2 | 5/2010 | Sullivan et al. | |
| 7,785,216 B2 | 8/2010 | Hebert et al. | |
| 7,935,004 B2 | 5/2011 | Dalton et al. | |
| 8,272,971 B2 | 9/2012 | Tutmark | |
| 8,998,750 B2* | 4/2015 | Sullivan | A63B 37/0058 473/376 |
| 9,126,083 B2* | 9/2015 | Sullivan | A63B 37/0051 |
| 9,180,346 B2* | 11/2015 | Binette | A63B 37/0051 |
| 9,248,350 B2* | 2/2016 | Sullivan | A63B 37/0064 |
| 9,375,612 B2* | 6/2016 | Comeau | A63B 37/0066 |
| 9,656,127 B2* | 5/2017 | Binette | A63B 37/0051 |
| 10,010,765 B2* | 7/2018 | Sullivan | A63B 37/0032 |
| 2014/0113745 A1* | 4/2014 | Sullivan | A63B 37/006 473/372 |
| 2014/0256469 A1* | 9/2014 | Sullivan | A63B 37/0032 473/373 |
| 2014/0323241 A1* | 10/2014 | Sullivan | A63B 37/0058 473/374 |
| 2014/0323244 A1* | 10/2014 | Sullivan | A63B 37/0038 473/376 |
| 2015/0087444 A1* | 3/2015 | Sullivan | A63B 37/0051 473/374 |
| 2015/0126307 A1* | 5/2015 | Comeau | A63B 37/0066 473/376 |
| 2015/0157897 A1* | 6/2015 | Sullivan | A63B 37/0064 473/376 |
| 2016/0096077 A1* | 4/2016 | Sullivan | A63B 37/0032 473/376 |
| 2016/0129315 A1* | 5/2016 | Sullivan | A63B 37/0063 473/371 |
| 2016/0144242 A1* | 5/2016 | Sullivan | A63B 37/0064 473/376 |
| 2016/0151678 A1* | 6/2016 | Sullivan | A63B 37/0058 473/376 |
| 2016/0303430 A1* | 10/2016 | Sullivan | A63B 37/0058 |
| 2017/0021232 A1* | 1/2017 | Sullivan | A63B 37/0038 |
| 2017/0036070 A1* | 2/2017 | Sullivan | A63B 37/0058 |
| 2017/0050085 A1* | 2/2017 | Sullivan | A63B 37/0033 |
| 2017/0050087 A1* | 2/2017 | Sullivan | A63B 37/0058 |
| 2017/0080296 A1* | 3/2017 | Sullivan | A63B 37/0032 |

* cited by examiner

GOLF BALLS HAVING A CORE WITH SURROUNDING INTERMEDIATE FOAM LAYER

CROSS-REFERENCE TO RELATED APPLICATIONS

This application is a continuation-in-part of co-pending, co-assigned U.S. patent application Ser. No. 15/071,381, filed on Mar. 16, 2016, now allowed, the entire disclosure of which is incorporated by reference.

BACKGROUND OF THE INVENTION

Field of the Invention

The present invention relates generally to multi-piece, golf balls made of non-foamed and foamed compositions. In one embodiment, a non-foamed single or dual core is made and a foamed composition, for example, polyurethane foam, is cast over the core to form an intermediate layer. The ball further includes a cover of at least one layer. The core, intermediate, and cover layers may have different properties, for example, flex modulus, hardness, and specific gravity values.

Brief Review of the Related Art

Both professional and amateur golfer use multi-piece, solid golf balls today. Basically, a two-piece solid golf ball includes a solid inner core protected by an outer cover. Normally, the inner core is made of a natural or synthetic rubber such as polybutadiene, styrene butadiene, or polyisoprene. The cover surrounds the inner core and may be made of a variety of materials including ethylene acid copolymer ionomers, polyamides, polyesters, polyurethanes, and polyureas.

In recent years, three-piece, four-piece, and even five-piece balls have become more popular. New manufacturing technologies, lower material costs, and desirable ball playing performance properties have contributed to these multi-piece balls becoming more popular. Many golf balls used today have multi-layered cores comprising an inner core and at least one surrounding outer core layer. For example, the inner core may be made of a relatively soft and resilient material, while the outer core may be made of a harder and more rigid material. The "dual-core" subassembly is encapsulated by a cover of at least one layer to make a finished ball. Different materials can be used to manufacture the core and cover layers and provide various properties to the finished ball.

In general, dual-cores comprising an inner core (or center) and a surrounding outer core layer are known in the industry. For example, Chikaraishi et al., U.S. Pat. No. 5,048,838 discloses a three-piece golf ball containing a two-piece solid core and a cover. The dense inner core has a diameter in the range of 15-25 mm with a specific gravity of 1.2 to 4.0 and the outer core layer has a specific gravity of 0.1 to 3.0 less than the specific gravity of the inner core. The inner and outer cores are made of rubber compositions. Watanabe, U.S. Pat. No. 7,160,208 discloses a three-piece golf ball comprising a rubber-based inner core; a rubber-based outer core layer; and a polyurethane elastomer-based cover. The inner core layer has a JIS-C hardness of 50 to 85; the outer core layer has a JIS-C hardness of 70 to 90; and the cover has a Shore D hardness of 46 to 55. Also, the inner core has a specific gravity of more than 1.0, and the core outer layer has a specific gravity equal to or greater than that of of the inner core.

The core sub-structure located inside of the golf ball acts as an engine or spring for the ball. Thus, the composition and construction of the core is a key factor in determining the resiliency and rebounding performance of the ball. In general, the rebounding performance of the ball is determined by calculating its initial velocity after being struck by the face of the golf club and its outgoing velocity after making impact with a hard surface. More particularly, the "Coefficient of Restitution" or "COR" of a golf ball refers to the ratio of a ball's rebound velocity to its initial incoming velocity when the ball is fired out of an air cannon into a rigid vertical plate. The COR for a golf ball is written as a decimal value between zero and one. A golf ball may have different COR values at different initial velocities. The United States Golf Association (USGA) sets limits on the initial velocity of the ball so one objective of golf ball manufacturers is to maximize COR under such conditions. Balls with a higher rebound velocity have a higher COR value. Such golf balls rebound faster, retain more total energy when struck with a club, and have longer flight distance as opposed to balls with low COR values. These properties are particularly important for long distance shots. For example, balls having high resiliency and COR values tend to travel a far distance when struck by a driver club from a tee.

The durability, spin rate, and feel of the ball also are important properties. In general, the durability of the ball refers to the impact-resistance of the ball. Balls having low durability appear worn and damaged even when such balls are used only for brief time periods. In some instances, the cover may be cracked or torn. The spin rate refers to the ball's rate of rotation after it is hit by a club. Balls having a relatively high spin rate are advantageous for short distance shots made with irons and wedges. Professional and highly skilled amateur golfers can place a back spin more easily on such balls. This helps a player better control the ball and improves shot accuracy and placement. By placing the right amount of spin on the ball, the player can get the ball to stop precisely on the green or place a fade on the ball during approach shots. On the other hand, recreational players who cannot intentionally control the spin of the ball when hitting it with a club are less likely to use high spin balls. For such players, the ball can spin sideways more easily and drift far-off the course, especially if it is hooked or sliced. Meanwhile, the "feel" of the ball generally refers to the sensation that a player experiences when striking the ball with the club and it is a difficult property to quantify. Most players prefer balls having a soft feel, because the player experience a more natural and comfortable sensation when their club face makes contact with these balls. Balls having a softer feel are particularly desirable when making short shots around the green, because the player senses more with such balls. The feel of the ball primarily depends upon the hardness and compression of the ball.

Manufacturers of golf balls are constantly looking to different materials and ball constructions for improving the playing performance and other properties of the ball. For example, hard and durable materials having a relatively high flex modulus can be used to make a relatively hard core. The resulting golf ball tends to travel a long distance because of the high velocity imparted by the hard core. However, one disadvantage with these harder balls is they tend to provide the golfer with a rougher and harder "feel." Thus, the player may experience a more uncomfortable and unnatural sensation as the club face makes impact with the ball. Moreover, the player tends to have less control when hitting relatively hard balls. It generally is more difficult to hit hard balls with the proper touch and spin.

To address these problems, golf ball manufacturers have looked at softer and lighter-weight materials, such as foams, for making the inner core. For example, Puckett and Cadorniga, U.S. Pat. Nos. 4,836,552 and 4,839,116 disclose one-piece, short distance golf balls made of a foam composition comprising a thermoplastic polymer (ethylene acid copolymer ionomer such as Surlyn®) and filler material (microscopic glass bubbles). The density of the composition increases from the center to the surface of the ball. Thus, the ball has relatively dense outer skin and a cellular inner core. According to the '552 and '116 Patents, by providing a short distance golf ball, which will play approximately 50% of the distance of a conventional golf ball, the land requirements for a golf course can be reduced 67% to 50%.

Gentiluomo, U.S. Pat. No. 5,104,126 discloses a three-piece ball with a dense inner core made of steel, lead, brass, zinc, copper, and a filled elastomer, wherein the core has a specific gravity of at least 1.25. The inner core is encapsulated by a lower density syntactic foam composition, and the core construction is encapsulated by an ionomer cover. Yabuki et al., U.S. Pat. No. 5,482,285 discloses a three-piece golf ball having an inner core and outer core encapsulated by an ionomer cover. The specific gravity of the outer core is reduced so that it falls within the range of 0.2 to 1.0. The specific gravity of the inner core is adjusted accordingly so that the total weight of the inner/outer core falls within a range of 32.0 to 39.0 g. The inner core may be formed of a rubber composition and the outer core may be formed of a foamed resin such as an ionomer polyethylene, or polystyrene resin, or a thermosetting resin such as a phenol resin.

Aoyama, U.S. Pat. Nos. 5,688,192 and 5,823,889 disclose a golf ball containing a core, wherein the core comprises an inner and outer portion, and a cover made of a material such as balata rubber or ethylene acid copolymer ionomer. The core is made by foaming, injecting a compressible material, gasses, blowing agents, or gas-containing microspheres into polybutadiene or other core material. According to the '889 Patent, polyurethane compositions may be used. The compressible material, for example, gas-containing compressible cells may be dispersed in a limited part of the core so that the portion containing the compressible material has a specific gravity of greater than 1.00.

Sullivan and Binette, U.S. Pat. No. 5,833,553 discloses a golf ball having core with a coefficient of restitution of at least 0.650 and a cover with a thickness of at least 3.6 mm (0.142 inches) and a Shore D hardness of at least 60. According to the '553 Patent, the combination of a soft core with a thick, hard cover results in a ball having better distance. The '553 Patent discloses that the core may be formed from a uniform composition or may be a dual or multi-layer core, and it may be foamed or unfoamed. Polybutadiene rubber, natural rubber, metallocene catalyzed polyolefins, and polyurethanes are described as being suitable materials for making the core.

Sullivan and Ladd, U.S. Pat. No. 6,688,991 discloses a golf ball containing a low specific gravity core and an optional intermediate layer. This subassembly is encased within a high specific gravity cover with Shore D hardness in the range of about 40 to about 80. The core is preferably made from a highly neutralized thermoplastic polymer such as ethylene acid copolymer which has been foamed. The cover preferably has high specific gravity fillers dispersed therein.

Nesbitt, U.S. Pat. No. 6,767,294 discloses a golf ball comprising: i) a pressurized foamed inner center formed from a thermoset material, a thermoplastic material, or combinations thereof, a blowing agent and a cross-linking agent and, ii) an outer core layer formed from a second thermoset material, a thermoplastic material, or combinations thereof. Additionally, a barrier resin or film can be applied over the outer core layer to reduce the diffusion of the internal gas and pressure from the nucleus (center and outer core layer). Preferred polymers for the barrier layer have low permeability such as Saran® film (poly (vinylidene chloride), Barex® resin (acyrlonitrile-co-methyl acrylate), poly (vinyl alcohol), and PET film (polyethylene terephthalate). The '294 Patent does not disclose core layers having different hardness gradients.

Sullivan, Ladd, and Hebert, U.S. Pat. No. 7,708,654 discloses a golf ball having a foamed intermediate layer. Referring to FIG. 1 in the '654 Patent, the golf ball includes a core (12), an intermediate layer (14) made of a highly neutralized polymer having a reduced specific gravity (less than 0.95), and a cover (16). According to the '654 Patent, the intermediate layer can be an outer core, a mantle layer, or an inner cover. The reduction in specific gravity of the intermediate layer is caused by foaming the composition of the layer and this reduction can be as high as 30%. The '654 Patent discloses that other foamed compositions such as foamed polyurethanes and polyureas may be used to form the intermediate layer.

Tutmark, U.S. Pat. No. 8,272,971 is directed to golf balls containing an element that reduces the distance of the ball's flight path. In one embodiment, the ball includes a core and cover. A cavity is formed between core and cover and this may be filled by a foamed polyurethane "middle layer" in order to dampen the ball's flight properties. The foam of the middle layer is relatively light in weight; and the core is relatively heavy and dense. According to the '971 Patent, when a golfer strikes the ball with a club, the foam in the middle layer actuates and compresses, thereby absorbing much of the impact from the impact of the ball.

Although some foam constructions for golf balls have been considered over the years, there are drawbacks with using some foam materials. For example, some polymer materials are difficult to foam. Once the material is converted into foam, the foamed material may suffer from loss of impact durability. Also, it can be difficult to adjust the specific gravity of some foamed materials without losing impact durability, toughness, resiliency (rebounding performance), and the like. Golf balls are exposed to a wide range of high and low temperatures during their life span. If the chemical and physical properties of the foamed composition change, the properties of the resulting golf ball core may be adversely affected. For example, there may be a negative impact on the size, resiliency, and hardness of the ball.

In view of some of the disadvantages with some foam compositions, it would be desirable to have new compositions and ball constructions including foamed layers with good stability. The resulting foamed layers should have good resiliency and impact durability over a wide temperature range. The specific gravity of the foamed layers should be easy to adjust without a loss in desirable properties. For example, the foamed layers should have high impact durability at high and low specific gravity levels. The present invention provides new foam compositions and golf ball constructions having such properties, features, and other benefits.

SUMMARY OF THE INVENTION

The present invention provides a multi-layered golf ball comprising a core comprising an inner core (center); outer core layer; and cover having at least one layer. In one version, the ball includes a core subassembly comprising: i) an inner core comprising a non-foamed thermoset or thermoplastic composition, wherein the inner core has a diameter in the range of about 0.750 to about 1.500 inches, and ii) an intermediate layer comprising a foamed composition, wherein the outer core layer is disposed about the inner core and has a thickness in the range of about 0.025 to about 0.800 inches. Preferably, the foamed intermediate layer is made from a foamed thermoset composition.

Non-foamed thermoset or thermoplastic materials are used to form the inner core. For example, polybutadiene rubber may be used. While, foamed compositions are used to form the intermediate layer. In one version, the intermediate layer comprises a foamed polyurethane composition prepared from a mixture comprising polyisocyanate, polyol, and curing agent compounds, and blowing agent. Aromatic and aliphatic polyisocyanates may be used. The foamed polyurethane composition may be prepared by using water as a blowing agent. The water is added to the mixture in a sufficient amount to cause the mixture to foam. Surfactants, catalysts, mineral fillers, and other additives may be included in the mixture.

A cover having single or multiple layers is disposed about the intermediated layer. For example, a cover layer can be prepared from an ionomer composition comprising an O/X/Y-type copolymer, wherein O is α-olefin, X is a $C_3$-$C_8$ α,β-ethylenically unsaturated carboxylic acid, and Y is an acrylate selected from alkyl acrylates and aryl acrylates, wherein greater than 70% of the acid groups are neutralized with a metal ion. Polyurethane, polyurea and polyurethane/polyurea hybrid covers also can be prepared.

The core and intermediate layers may have different hardness gradients. For example, the inner core can have a positive hardness gradient; and the intermediate layer can have a positive hardness gradient. In a second embodiment, the inner core has a zero or negative hardness gradient, and the intermediate layer has a positive hardness gradient.

The inner core has a specific gravity and intermediate layer has a specific gravity. Preferably, the specific gravity of the inner core is greater than the specific gravity of the intermediate layer. Further, in one preferred embodiment, the intermediate layer has a specific gravity gradient, wherein the intermediate layer has an outer surface specific gravity and a midpoint specific gravity, the outer surface specific gravity being greater than the midpoint specific gravity.

In yet another embodiment, there are two intermediate layers. A first intermediate layer is disposed about the core and a second intermediate layer is located adjacent to the first intermediate layer, wherein at least one of the intermediate layers comprises a foamed thermoset composition. For example, the first intermediate layer can comprise the foamed thermoset composition. In another example, the second intermediate layer can comprise the foamed thermoset composition. In yet another example, both the first and second intermediate layers can comprise foamed thermoset compositions.

Foamed thermoplastic compositions also can be used to form the foamed intermediate layer. For example, the intermediate layer can comprise a foamed thermoplastic polymer selected from the group consisting of partially-neutralized ethylene acid copolymer ionomers; highly-neutralized ethylene acid copolymer ionomers; polyesters; polyamides; polyamide-ethers, polyamide-esters; polyurethanes, polyureas; fluoropolymers; polystyrenes; polypropylenes; polyethylenes; polyvinyl chlorides; polyvinyl acetates; polycarbonates; polyvinyl alcohols; polyester-ethers; polyethers; polyimides, polyetherketones, polyamideimides; and mixtures thereof. Preferably, the thermoplastic polymer is selected from partially-neutralized ethylene acid copolymer ionomers; highly-neutralized ethylene acid copolymer ionomers; and mixtures thereof.

BRIEF DESCRIPTION OF THE DRAWINGS

The novel features that are characteristic of the present invention are set forth in the appended claims. However, the preferred embodiments of the invention, together with further objects and attendant advantages, are best understood by reference to the following detailed description in connection with the accompanying drawings in which:

DETAILED DESCRIPTION OF THE INVENTION

Golf Ball Constructions

Figure 1:
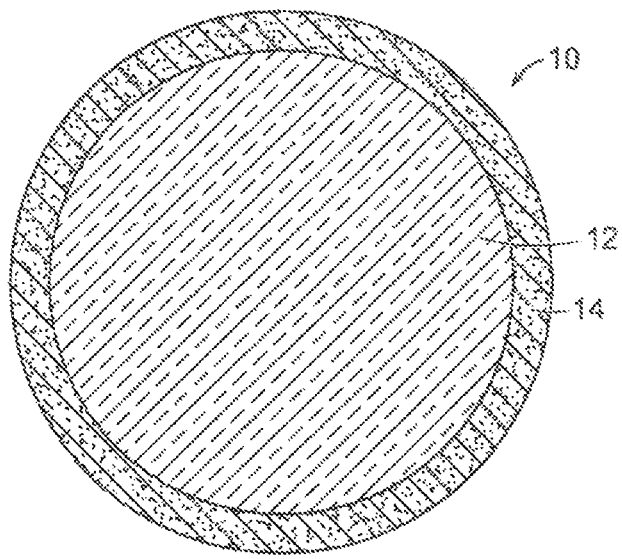
FIG. 1 is a cross-sectional view of a dual-layered core subassembly made in accordance with the present invention.

Golf balls having various constructions may be made in accordance with this invention. For example, golf balls having three piece, four-piece, and five-piece constructions with single or multi-layered cover materials may be made. Representative illustrations of such golf ball constructions are provided and discussed further below. The term, "layer" as used herein means generally any spherical portion of the golf ball. More particularly, in one version, a three-piece golf ball containing a core, intermediate layer, and single-layered cover is made. As used herein, the term, "intermediate layer" means a layer of the ball disposed between the core and cover. The intermediate layer also may be referred to as a mantle or casing layer. In another embodiment, a four-piece ball containing a dual-core, intermediate layer, and single-layered cover is made. The dual-core includes an inner core (center) and surrounding outer core layer. In another version, a five-piece golf ball containing a dual-core, intermediate layer, and dual-cover (inner cover and outer cover layers) is made. Six-piece balls also can be made. The diameter and thickness of the different layers along with properties such as hardness and compression may vary depending upon the construction and desired playing performance properties of the golf ball.

Inner Core Composition

As discussed above, the golf ball preferably contains an inner core (center) made from a non-foamed composition. In one preferred embodiment, the inner core is made from a non-foamed thermoset composition and more preferably from a non-foamed thermoset rubber composition. In another embodiment, a two-layered or dual-core is constructed, wherein the inner core (center) is surrounded by an outer core layer.

Suitable thermoset rubber materials that may be used to form the inner core layer (center) include, but are not limited to, polybutadiene, polyisoprene, ethylene propylene rubber ("EPR"), ethylene-propylene-diene ("EPDM") rubber, styrene-butadiene rubber, styrenic block copolymer rubbers (such as "SI", "SIS", "SB", "SBS", "SIBS", and the like, where "S" is styrene, "I" is isobutylene, and "B" is butadiene), polyalkenamers such as, for example, polyoctenamer, butyl rubber, halobutyl rubber, polystyrene elastomers, polyethylene elastomers, polyurethane elastomers, polyurea elastomers, metallocene-catalyzed elastomers and plastomers, copolymers of isobutylene and p-alkylstyrene, halogenated copolymers of isobutylene and p-alkylstyrene, copolymers of butadiene with acrylonitrile, polychloroprene, alkyl acrylate rubber, chlorinated isoprene rubber, acrylonitrile chlorinated isoprene rubber, and blends of two or more thereof. In another embodiment, a two-layered or dual-core is constructed, wherein the inner core (center) is surrounded by an outer core layer. Preferably, the inner core and outer core layers are both formed from a polybutadiene rubber composition.

The thermoset rubber composition may be cured using conventional curing processes. Suitable curing processes include, for example, peroxide-curing, sulfur-curing, high-energy radiation, and combinations thereof. Preferably, the rubber composition contains a free-radical initiator selected from organic peroxides, high energy radiation sources capable of generating free-radicals, and combinations thereof. In one preferred version, the rubber composition is peroxide-cured. Suitable organic peroxides include, but are not limited to, dicumyl peroxide; n-butyl-4,4-di(t-butylperoxy) valerate; 1,1-di(t-butylperoxy)3,3,5-trimethylcyclohexane; 2,5-dimethyl-2,5-di(t-butylperoxy) hexane; di-t-butyl peroxide; di-t-amyl peroxide; t-butyl peroxide; t-butyl cumyl peroxide; 2,5-dimethyl-2,5-di(t-butylperoxy)hexyne-3; di(2-t-butyl-peroxyisopropyl)benzene; dilauroyl peroxide; dibenzoyl peroxide; t-butyl hydroperoxide; and combinations thereof. In a particular embodiment, the free radical initiator is dicumyl peroxide, including, but not limited to Perkadox® BC, commercially available from Akzo Nobel. Peroxide free-radical initiators are generally present in the rubber composition in an amount of at least 0.05 parts by weight per 100 parts of the total rubber, or an amount within the range having a lower limit of 0.05 parts or 0.1 parts or 1 part or 1.25 parts or 1.5 parts or 2.5 parts or 5 parts by weight per 100 parts of the total rubbers, and an upper limit of 2.5 parts or 3 parts or 5 parts or 6 parts or 10 parts or 15 parts by weight per 100 parts of the total rubber. Concentrations are in parts per hundred (phr) unless otherwise indicated. As used herein, the term, "parts per hundred," also known as "phr" or "pph" is defined as the number of parts by weight of a particular component present in a mixture, relative to 100 parts by weight of the polymer component. Mathematically, this can be expressed as the weight of an ingredient divided by the total weight of the polymer, multiplied by a factor of 100.

The rubber compositions may further include a reactive cross-linking co-agent. Suitable co-agents include, but are not limited to, metal salts of unsaturated carboxylic acids having from 3 to 8 carbon atoms; unsaturated vinyl compounds and polyfunctional monomers (e.g., trimethylolpropane trimethacrylate); phenylene bismaleimide; and combinations thereof. Particular examples of suitable metal salts include, but are not limited to, one or more metal salts of acrylates, diacrylates, methacrylates, and dimethacrylates, wherein the metal is selected from magnesium, calcium, zinc, aluminum, lithium, and nickel. In a particular embodiment, the co-agent is selected from zinc salts of acrylates, diacrylates, methacrylates, and dimethacrylates. In another particular embodiment, the agent is zinc diacrylate (ZDA). When the co-agent is zinc diacrylate and/or zinc dimethacrylate, the co-agent is typically included in the rubber composition in an amount within the range having a lower limit of 1 or 5 or 10 or 15 or 19 or 20 parts by weight per 100 parts of the total rubber, and an upper limit of 24 or 25 or 30 or 35 or 40 or 45 or 50 or 60 parts by weight per 100 parts of the base rubber.

Radical scavengers such as a halogenated organosulfur, organic disulfide, or inorganic disulfide compounds may be added to the rubber composition. These compounds also may function as "soft and fast agents." As used herein, "soft and fast agent" means any compound or a blend thereof that is capable of making a core: 1) softer (having a lower compression) at a constant "coefficient of restitution" (COR); and/or 2) faster (having a higher COR at equal compression), when compared to a core equivalently prepared without a soft and fast agent. Preferred halogenated organosulfur compounds include, but are not limited to, pentachlorothiophenol (PCTP) and salts of PCTP such as zinc pentachlorothiophenol (ZnPCTP). Using PCTP and ZnPCTP in golf ball inner cores helps produce softer and faster inner cores. The PCTP and ZnPCTP compounds help increase the resiliency and the coefficient of restitution of the core. In a particular embodiment, the soft and fast agent is selected from ZnPCTP, PCTP, ditolyl disulfide, diphenyl disulfide, dixylyl disulfide, 2-nitroresorcinol, and combinations thereof.

In addition, the rubber compositions may include antioxidants. Also, processing aids such as high molecular weight organic acids and salts thereof may be added to the composition. Other ingredients such as accelerators, dyes and pigments, wetting agents, surfactants, plasticizers, coloring agents, fluorescent agents, stabilizers, softening agents, impact modifiers, antiozonants, as well as other additives known in the art may be added to the rubber composition. The rubber composition also may include filler(s) such as materials selected from carbon black, clay and nanoclay particles as discussed above, talc (e.g., Luzenac HAR® high aspect ratio talcs, commercially available from Luzenac America, Inc.), glass (e.g., glass flake, milled glass, and microglass), mica and mica-based pigments (e.g., Iriodin® pearl luster pigments, commercially available from The Merck Group), and combinations thereof. Metal fillers such as, for example, particulate; powders; flakes; and fibers of copper, steel, brass, tungsten, titanium, aluminum, magnesium, molybdenum, cobalt, nickel, iron, lead, tin, zinc, barium, bismuth, bronze, silver, gold, and platinum, and alloys and combinations thereof also may be added to the rubber composition to adjust the specific gravity of the composition as needed. As discussed above, the inner core layer preferably has a specific gravity (density) greater than the inner core layer's specific gravity. Thus, metal or other fillers may be added to the polybutadiene rubber composition (or other thermoset material) used to form the inner core layer in a sufficient amount so the specific gravity of the inner core remains greater than the specific gravity of the outer core.

Examples of commercially-available polybutadiene rubbers that can be used in accordance with this invention, include, but are not limited to, BR 01 and BR 1220, available from BST Elastomers of Bangkok, Thailand; SE BR 1220LA and SE BR1203, available from DOW Chemical Co of Midland, Mich.; BUDENE 1207, 1207s, 1208, and 1280 available from Goodyear, Inc of Akron, Ohio; BR 01, 51 and 730, available from Japan Synthetic Rubber (JSR) of Tokyo, Japan; BUNA CB 21, CB 22, CB 23, CB 24, CB 25, CB 29 MES, CB 60, CB Nd 60, CB 55 NF, CB 70 B, CB KA 8967, and CB 1221, available from Lanxess Corp. of Pittsburgh. Pa.; BR1208, available from LG Chemical of Seoul, South Korea; UBEPOL BR130B, BR150, BR150B, BR150L, BR230, BR360L, BR710, and VCR617, available from UBE Industries, Ltd. of Tokyo, Japan; EUROPRENE NEO-CIS BR 60, INTENE 60 AF and P30AF, and EUROPRENE BR HV80, available from Polimeri Europa of Rome, Italy; AFDENE 50 and NEODENE BR40, BR45, BR50 and BR60, available from Karbochem (PTY) Ltd. of Bruma, South Africa; KBR 01, NdBr 40, NdBR-45, NdBr 60, KBR 710S, KBR 710H, and KBR 750, available from Kumho Petrochemical Co., Ltd. Of Seoul, South Korea; and DIENE 55NF, 70AC, and 320 AC, available from Firestone Polymers of Akron, Ohio.

The polybutadiene rubber is used in an amount of at least about 5% by weight based on total weight of composition and is generally present in an amount of about 5% to about 100%, or an amount within a range having a lower limit of 5% or 10% or 20% or 30% or 40% or 50% and an upper limit of 55% or 60% or 70% or 80% or 90% or 95% or 100%. Preferably, the concentration of polybutadiene rubber is about 40 to about 95 weight percent. If desirable, lesser amounts of other thermoset materials may be incorporated into the base rubber. Such materials include the rubbers discussed above, for example, cis-polyisoprene, trans-polyisoprene, balata, polychloroprene, polynorbornene, polyoctenamer, polypentenamer, butyl rubber, EPR, EPDM, styrene-butadiene, and the like.

As discussed above, in one preferred embodiment, a thermoset rubber composition is used to form the inner core. In alternative embodiments, the inner core layer is made from a thermoplastic material, for example, an ethylene acid copolymer ionomer composition. Other suitable thermoplastic polymers that may be used to form the inner core layer include, but are not limited to, the following polymers (including homopolymers, copolymers, and derivatives thereof.) (a) polyesters, particularly those modified with a compatibilizing group such as sulfonate or phosphonate, including modified poly(ethylene terephthalate), modified poly(butylene terephthalate), modified poly(propylene terephthalate), modified poly(trimethylene terephthalate), modified poly(ethylene naphthenate), and those disclosed in U.S. Pat. Nos. 6,353,050, 6,274,298, and 6,001,930, the entire disclosures of which are hereby incorporated herein by reference, and blends of two or more thereof; (b) polyamides, polyamide-ethers, and polyamide-esters, and those disclosed in U.S. Pat. Nos. 6,187,864, 6,001,930, and 5,981,654, the entire disclosures of which are hereby incorporated herein by reference, and blends of two or more thereof; (c) polyurethanes, polyureas, polyurethane-polyurea hybrids, and blends of two or more thereof; (d) fluoropolymers, such as those disclosed in U.S. Pat. Nos. 5,691,066, 6,747,110 and 7,009,002, the entire disclosures of which are hereby incorporated herein by reference, and blends of two or more thereof; (e) polystyrenes, such as poly(styrene-co-maleic anhydride), acrylonitrile-butadiene-styrene, poly(styrene sulfonate), polyethylene styrene, and blends of two or more thereof; (f) polyvinyl chlorides and grafted polyvinyl chlorides, and blends of two or more thereof; (g) polycarbonates, blends of polycarbonate/acrylonitrile-butadiene-styrene, blends of polycarbonate/polyurethane, blends of polycarbonate/polyester, and blends of two or more thereof; (h) polyethers, such as polyarylene ethers, polyphenylene oxides, block copolymers of alkenyl aromatics with vinyl aromatics and polyamicesters, and blends of two or more thereof; (i) polyimides, polyetherketones, polyamideimides, and blends of two or more thereof; and (j) polycarbonate/polyester copolymers and blends.

It also is recognized that thermoplastic materials can be "converted" into thermoset materials by cross-linking the polymer chains so they form a network structure, and such cross-linked thermoplastic materials may be used to form the inner cover layers in accordance with this invention. For example, thermoplastic polyolefins such as linear low density polyethylene (LLDPE), low density polyethylene (LDPE), and high density polyethylene (HDPE) may be cross-linked to form bonds between the polymer chains. The cross-linked thermoplastic material typically has improved physical properties and strength over non-cross-linked thermoplastics, particularly at temperatures above the crystalline melting point. Preferably a partially or fully-neutralized ionomer, as described above, is covalently cross-linked to render it into a thermoset composition (that is, it contains at least some level of covalent, irreversable cross-links). Thermoplastic polyurethanes and polyureas also may be converted into thermoset materials in accordance with the present invention.

Modifications in the thermoplastic polymeric structure of thermoplastics can be induced by a number of methods, including exposing the thermoplastic material to high-energy radiation or through a chemical process using peroxide. Radiation sources include, but are not limited to, gamma-rays, electrons, neutrons, protons, x-rays, helium nuclei, or the like. Gamma radiation, typically using radioactive cobalt atoms and allows for considerable depth of treatment, if necessary. For core layers requiring lower depth of penetration, electron-beam accelerators or UV and IR light sources can be used. Useful UV and IR irradiation methods are disclosed in U.S. Pat. Nos. 6,855,070 and 7,198,576, which are incorporated herein by reference. The thermoplastic core layers may be irradiated at dosages greater than 0.05 Mrd, preferably ranging from 1 Mrd to 20 Mrd, more preferably from 2 Mrd to 15 Mrd, and most preferably from 4 Mrd to 10 Mrd. In one preferred embodiment, the cores are irradiated at a dosage from 5 Mrd to 8 Mrd and in another preferred embodiment, the cores are irradiated with a dosage from 0.05 Mrd to 3 Mrd, more preferably 0.05 Mrd to 1.5 Mrd.

The cross-linked thermoplastic material may be created by exposing the thermoplastic to: 1) a high-energy radiation treatment, such as electron beam or gamma radiation, such as disclosed in U.S. Pat. No. 5,891,973, which is incorporated by reference herein, 2) lower energy radiation, such as ultra-violet (UV) or infra-red (IR) radiation; 3) a solution treatment, such as an isocyanate or a silane; 4) incorporation of additional free radical initiator groups in the thermoplastic prior to molding; and/or 5) chemical modification, such as esterification or saponification, to name a few.

Outer Core Composition

As discussed above, the inner core may be formed from thermoset or thermoplastic materials and is preferably formed from a non-foamed thermoset rubber. In one embodiment, a dual-core subassembly having an inner core and surrounding outer core layer is formed. The outer core layer also may be formed from thermoset or thermoplastic materials. In one preferred embodiment, both the inner core and outer core layers are formed from a thermoset rubber composition. That is, the inner core may be formed from a first thermoset rubber composition; and the outer core layer may be formed from a second thermoset rubber composition.

In one embodiment, the inner and outer core layers have the same specific gravity levels. In a second embodiment, the specific gravity of the inner core is greater than the specific gravity of the outer core layer. Finally, in a third embodiment, the specific gravity of the inner core is less than the specific gravity of the outer core layer. Thus, both the inner and outer core layers may be formed from a polybutadiene rubber composition. The rubber compositions may contain conventional additives such as free-radical initiators, cross-linking agents, soft and fast agents, and antioxidants, and the composition may be cured using conventional systems as described above. If, in one example, the objective is to make the specific gravities of the inner core and outer core layers different, the concentration and/or type of metal fillers used in the respective compositions may be adjusted to achieve this result. For example, the outer core layer may contain a relatively small concentration of metal fillers, while the inner core contains a large concentration of metal fillers.

Intermediate Layer Composition

Figure 2:
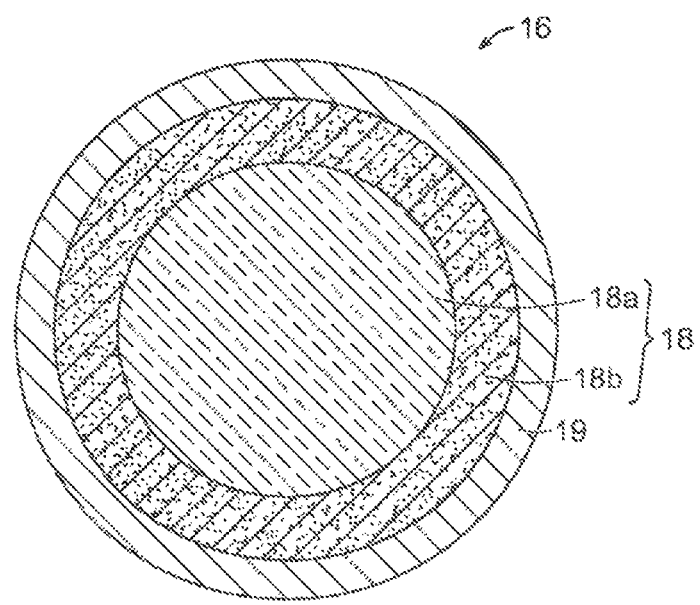
FIG. 2 is a cross-sectional view of a three-piece golf ball having a dual-layered core made in accordance with the present invention.
Figure 3:
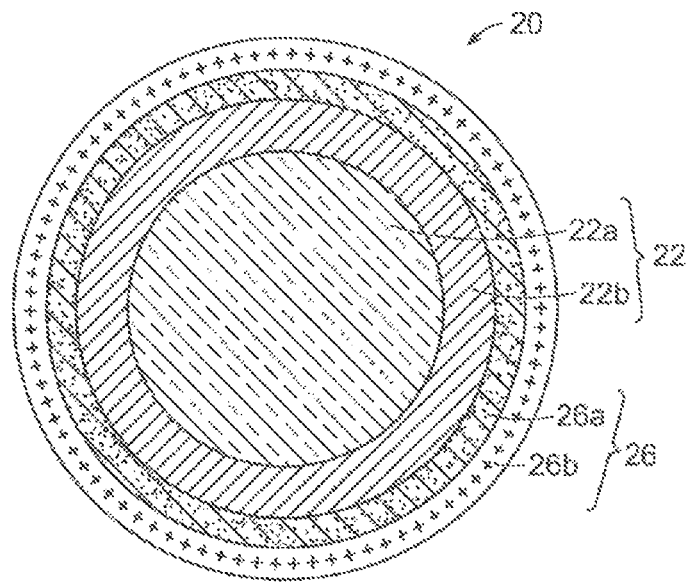
FIG. 3 is a cross-sectional view of a four-piece golf ball having a dual-layered core made in accordance with the present invention.

In the present invention, the inner core (center) preferably comprises a non-foamed thermoset or thermoplastic polymer composition. As discussed above, dual-core sub-assemblies including an inner core and outer core layer also can be made. Meanwhile, the intermediate layer, which surrounds the inner core or dual-core sub-assembly, preferably comprises a foamed thermoset or thermoplastic composition. Referring to FIG. 1, one version of a ball sub-assembly comprising an inner core and foamed intermediate layer that can be made in accordance with this invention is generally indicated at (10). The sub-assembly (10) includes a non-foamed inner core (center) (12) and a surrounding foamed intermediate layer (14). The dual-core is used to construct a golf ball as shown in FIG. 2. Here, the golf ball (16) contains a sub-assembly (18) having a center (18a) and intermediate layer (18b) surrounded by a single-layered cover (19). In another version, referring to FIG. 3, the golf ball (20) contains a dual-core (22) having a center (22a) and outer core layer (22b). The dual-core (22) is surrounded by a multi-layered structure (26) having an intermediate layer (26a) and outer cover layer (26b).

The foamed composition used to form the intermediate layer may have an open or closed cellular structure or combinations thereof and the foam structure may range from relatively rigid foam to very flexible foam. The hardness, flex modulus, specific gravity, and other properties of the foamed intermediate layer can be adjusted as needed. One key feature of the present invention is the specific gravity of the foamed intermediate layer can be adjusted without sacrificing the impact durability of the layer and finished ball. For example, the specific gravity of the foamed intermediate layer can be adjusted so the layer has a relatively low specific gravity or a relatively high specific gravity, while maintaining toughness, impact durability, and resiliency. The different specific gravity levels of the foamed intermediate layer are discussed further below.

In general, foam compositions are made by forming gas bubbles in a polymer mixture using a foaming (blowing) agent. As the bubbles form, the mixture expands and forms a foam composition that can be molded into an end-use product having either an open or closed cellular structure. Flexible foams generally have an open cell structure, where the cells walls are incomplete and contain small holes through which liquid and air can permeate. Such flexible foams are used traditionally for automobile seats, cushioning, mattresses, and the like. Rigid foams generally have a closed cell structure, where the cell walls are continuous and complete, and are used for used traditionally for automobile panels and parts, building insulation and the like. Many foams contain both open and closed cells. It also is possible to formulate flexible foams having a closed cell structure and likewise to formulate rigid foams having an open cell structure.

A wide variety of thermoplastic and thermoset materials may be used in generating the foam composition of this invention including, for example, polyurethanes; polyureas; copolymers, blends and hybrids of polyurethane and polyurea; olefin-based copolymer ionomer resins (for example, Surlyn® ionomer resins and DuPont HPF® 1000 and HPF® 2000, commercially available from DuPont; Iotek® ionomers, commercially available from ExxonMobil Chemical Company; Amplify® IO ionomers of ethylene acrylic acid copolymers, commercially available from Dow Chemical Company; and Clarix® ionomer resins, commercially available from A. Schulman Inc.); polyethylene, including, for example, low density polyethylene, linear low density polyethylene, and high density polyethylene; polypropylene; rubber-toughened olefin polymers; acid copolymers, for example, poly(meth)acrylic acid, which do not become part of an ionomeric copolymer; plastomers; flexomers; styrene/butadiene/styrene block copolymers; styrene/ethylene-butylene/styrene block copolymers; dynamically vulcanized elastomers; copolymers of ethylene and vinyl acetates; copolymers of ethylene and methyl acrylates; polyvinyl chloride resins; polyamides, poly(amide-ester) elastomers, and graft copolymers of ionomer and polyamide including, for example, Pebax® thermoplastic polyether block amides, commercially available from Arkema Inc; cross-linked trans-polyisoprene and blends thereof; polyester-based thermoplastic elastomers, such as Hytrel®, commercially available from DuPont or RiteFlex®, commercially available from Ticona Engineering Polymers; polyurethane-based thermoplastic elastomers, such as Elastollan®, commercially available from BASF; synthetic or natural vulcanized rubber; and combinations thereof. Castable polyurethanes, polyureas, and hybrids of polyurethanes-polyureas are particularly desirable because these materials can be used to make a golf ball having good playing performance properties as discussed further below. By the term, "hybrids of polyurethane and polyurea," it is meant to include copolymers and blends thereof.

Basically, polyurethane compositions contain urethane linkages formed by the reaction of a multi-functional isocyanate containing two or more NCO groups with a polyol having two or more hydroxyl groups (OH—OH) sometimes in the presence of a catalyst and other additives. Generally, polyurethanes can be produced in a single-step reaction (one-shot) or in a two-step reaction via a prepolymer or quasi-prepolymer. In the one-shot method, all of the components are combined at once, that is, all of the raw ingredients are added to a reaction vessel, and the reaction is allowed to take place. In the prepolymer method, an excess of polyisocyanate is first reacted with some amount of a polyol to form the prepolymer which contains reactive NCO groups. This prepolymer is then reacted again with a chain extender or curing agent polyol to form the final polyurethane. Polyurea compositions, which are distinct from the above-described polyurethanes, also can be formed. In general, polyurea compositions contain urea linkages formed by reacting an isocyanate group (—N═C═O) with an amine group (NH or $NH_2$). Polyureas can be produced in similar fashion to polyurethanes by either a one shot or prepolymer method. In forming a polyurea polymer, the polyol would be substituted with a suitable polyamine. Hybrid compositions containing urethane and urea linkages also may be produced. For example, when polyurethane prepolymer is reacted with amine-terminated curing agents during the chain-extending step, any excess isocyanate groups in the prepolymer will react with the amine groups in the curing agent. The resulting polyurethane-urea composition contains urethane and urea linkages and may be referred to as a hybrid. In another example, a hybrid composition may be produced when a polyurea prepolymer is reacted with a hydroxyl-terminated curing agent. A wide variety of isocyanates, polyols, polyamines, and curing agents can be used to form the polyurethane and polyurea compositions as discussed further below.

To prepare the foamed polyurethane, polyurea, or other polymer composition, a foaming agent is introduced into the polymer formulation. In general, there are two types of foaming agents: physical foaming agents and chemical foaming agents.

Physical Foaming Agents.

These foaming agents typically are gasses that are introduced under high pressure directly into the polymer composition. Chlorofluorocarbons (CFCs) and partially halogenated chlorofluorocarbons are effective, but these compounds are banned in many countries because of their environmental side effects. Alternatively, aliphatic and cyclic hydrocarbon gasses such as isobutene and pentane may be used. Inert gasses, such as carbon dioxide and nitrogen, also are suitable. With physical foaming agents, the isocyanate and polyol compounds react to form polyurethane linkages and the reaction generates heat. Foam cells are generated and as the foaming agent vaporizes, the gas becomes trapped in the cells of the foam.

Chemical Foaming Agents.

These foaming agents typically are in the form of powder, pellets, or liquids and they are added to the composition, where they decompose or react during heating and generate gaseous by-products (for example, nitrogen or carbon dioxide). The gas is dispersed and trapped throughout the composition and foams it. For example, water may be used as the foaming agent. Air bubbles are introduced into the mixture of the isocyanate and polyol compounds and water by high-speed mixing equipment. As discussed in more detail further below, the isocyanates react with the water to generate carbon dioxide which fills and expands the cells created during the mixing process.

Preferably, a chemical foaming agent is used to prepare the foam compositions of this invention. Chemical blowing agents may be inorganic, such as ammonium carbonate and carbonates of alkalai metals, or may be organic, such as azo and diazo compounds, such as nitrogen-based azo compounds. Suitable azo compounds include, but are not limited to, 2,2'-azobis(2-cyanobutane), 2,2'-azobis(methylbutyronitrile), azodicarbonamide, p,p'-oxybis(benzene sulfonyl hydrazide), p-toluene sulfonyl semicarbazide, p-toluene sulfonyl hydrazide. Other foaming agents include any of the Celogens® sold by Crompton Chemical Corporation, and nitroso compounds, sulfonylhydrazides, azides of organic acids and their analogs, triazines, tri- and tetrazole derivatives, sulfonyl semicarbazides, urea derivatives, guanidine derivatives, and esters such as alkoxyboroxines. Also, foaming agents that liberate gasses as a result of chemical interaction between components such as mixtures of acids and metals, mixtures of organic acids and inorganic carbonates, mixtures of nitriles and ammonium salts, and the hydrolytic decomposition of urea may be used. Water is a preferred foaming agent. When added to the polyurethane formulation, water will react with the isocyanate groups and form carbamic acid intermediates. The carbamic acids readily decarboxylate to form an amine and carbon dioxide. The newly formed amine can then further react with other isocyanate groups to form urea linkages and the carbon dioxide forms the bubbles to produce the foam.

During the decomposition reaction of certain chemical foaming agents, more heat and energy is released than is needed for the reaction. Once the decomposition has started, it continues for a relatively long time period. If these foaming agents are used, longer cooling periods are generally required. Hydrazide and azo-based compounds often are used as exothermic foaming agents. On the other hand, endothermic foaming agents need energy for decomposition. Thus, the release of the gasses quickly stops after the supply of heat to the composition has been terminated. If the composition is produced using these foaming agents, shorter cooling periods are needed. Bicarbonate and citric acid-based foaming agents can be used as exothermic foaming agents.

Other suitable foaming agents include expandable gas-containing microspheres. Exemplary microspheres consist of an acrylonitrile polymer shell encapsulating a volatile gas, such as isopentane gas. This gas is contained within the sphere as a blowing agent. In their unexpanded state, the diameter of these hollow spheres range from 10 to 17 μm and have a true density of 1000 to 1300 $kg/m^3$. When heated, the gas inside the shell increases its pressure and the thermoplastic shell softens, resulting in a dramatic increase of the volume of the microspheres. Fully expanded, the volume of the microspheres will increase more than 40 times (typical diameter values would be an increase from 10 to 40 μm), resulting in a true density below 30 $kg/m^3$ (0.25 lbs/gallon). Typical expansion temperatures range from 80-190° C. (176-374° F.). Such expandable microspheres are commercially available as Expancel® from Expancel of Sweden or Akzo Nobel.

Additionally, BASF polyurethane materials sold under the trade name Cellasto® and Elastocell®, microcellular polyurethanes, Elastopor® H that is a closed-cell polyurethane rigid foam, Elastoflex® W flexible foam systems, Elastoflex® E semiflexible foam systems, Elastofoam® flexible integrally-skinning systems, Elastolit® D/K/R integral rigid foams, Elastopan® S, Elastollan® thermoplastic polyurethane elastomers (TPUs), and the like may be used in accordance with the present invention. Furthermore, BASF closed-cell, pre-expanded thermoplastic (TPU) polyurethane foam, available under the mark, Infinergy™ also may be used to form the foam centers of the golf balls in accordance with this invention. It also is believed these foam materials would be useful in forming non-center foamed layers in a variety of golf ball constructions. Such closed-cell, pre-expanded TPU foams are described in Prissok et al., US Patent Applications 2012/0329892; 2012/0297513; and 2013/0227861; and U.S. Pat. No. 8,282,851 the disclosures of which are hereby incorporated by reference. Bayer also produces a variety of materials sold as Texin® TPUs, Baytec® and Vulkollan® elastomers, Baymer® rigid foams, Baydur® integral skinning foams, Bayfit® flexible foams available as castable, RIM grades, sprayable, and the like that may be used. Additional foam materials that may be used herein include polyisocyanurate foams and a variety of "thermoplastic" foams, which may be cross-linked to varying extents using free-radical (for example, peroxide) or radiation cross-linking (for example, UV, IR, Gamma, EB irradiation). Also, foams may be prepared from polybutadiene, polystyrene, polyolefin (including metallocene and other single site catalyzed polymers), ethylene vinyl acetate (EVA), acrylate copolymers, such as EMA, EBA, Nucrel®-type acid co and terpolymers, ethylene propylene rubber (such as EPR, EPDM, and any ethylene copolymers), styrene-butadiene, and SEBS (any Kraton-type), PVC, PVDC, CPE (chlorinated polyethylene). Epoxy foams, urea-formaldehyde foams, latex foams and sponge, silicone foams, fluoropolymer foams and syntactic foams (hollow sphere filled) also may be used. In particular, silicone foams may be used.

In addition to the polymer and foaming agent, the foam composition also may include other ingredients such as, for example, fillers, cross-linking agents, chain extenders, surfactants, dyes and pigments, coloring agents, fluorescent agents, adsorbents, stabilizers, softening agents, impact modifiers, antioxidants, antiozonants, and the like. The formulations used to prepare the polyurethane foam compositions of this invention preferably contain a polyol, polyisocyanate, water, an amine or hydroxyl curing agent, surfactant, and a catalyst as described further below.

More particularly, the foam composition this invention may be prepared from a composition comprising an aromatic polyurethane, which is preferably formed by reacting an aromatic diisocyanate with a polyol. Suitable aromatic diisocyanates that may be used in accordance with this invention include, for example, toluene 2,4-diisocyanate (TDI), toluene 2,6-diisocyanate (TDI), 4,4'-methylene diphenyl diisocyanate (MDI), 2,4'-methylene diphenyl diisocyanate (MDI), polymeric methylene diphenyl diisocyanate (PMDI), p-phenylene diisocyanate (PPDI), m-phenylene diisocyanate (PDI), naphthalene 1,5-diisocyanate (NDI), naphthalene 2,4-diisocyanate (NDI), p-xylene diisocyanate (XDI), and homopolymers and copolymers and blends thereof. The aromatic isocyanates are able to react with the hydroxyl or amine compounds and form a durable and tough polymer having a high melting point. The resulting polyurethane generally has good mechanical strength and tear-resistance.

Alternatively, the foamed composition may be prepared from a composition comprising aliphatic polyurethane, which is preferably formed by reacting an aliphatic diisocyanate with a polyol. Suitable aliphatic diisocyanates that may be used in accordance with this invention include, for example, isophorone diisocyanate (IPDI), 1,6-hexamethylene diisocyanate (HDI), 4,4'-dicyclohexylmethane diisocyanate ("$H_{12}$ MDI"), meta-tetramethylxylyene diisocyanate (TMXDI), trans-cyclohexane diisocyanate (CHDI), 1,3-bis(isocyanatomethyl)cyclohexane; 1,4-bis(isocyanatomethyl)cyclohexane; and homopolymers and copolymers and blends thereof. The resulting polyurethane generally has good light and thermal stability. Preferred polyfunctional isocyanates include 4,4'-methylene diphenyl diisocyanate (MDI), 2,4'-methylene diphenyl diisocyanate (MDI), and polymeric MDI having a functionality in the range of 2.0 to 3.5 and more preferably 2.2 to 2.5.

Any suitable polyol may be used to react with the polyisocyanate in accordance with this invention. Exemplary polyols include, but are not limited to, polyether polyols, hydroxy-terminated polybutadiene (including partially/fully hydrogenated derivatives), polyester polyols, polycaprolactone polyols, and polycarbonate polyols. In one preferred embodiment, the polyol includes polyether polyol. Examples include, but are not limited to, polytetramethylene ether glycol (PTMEG), polyethylene propylene glycol, polyoxypropylene glycol, and mixtures thereof. The hydrocarbon chain can have saturated or unsaturated bonds and substituted or unsubstituted aromatic and cyclic groups. Preferably, the polyol of the present invention includes PTMEG.

Chain extenders (curing agents) are added to the mixture to build-up the molecular weight of the polyurethane polymer. In general, hydroxyl-terminated curing agents, amine-terminated curing agents, and mixtures thereof are used.

A catalyst may be employed to promote the reaction between the isocyanate and polyol compounds. Suitable catalysts include, but are not limited to, bismuth catalyst; zinc octoate; tin catalysts such as bis-butyltin dilaurate, bis-butyltin diacetate, stannous octoate; tin (II) chloride, tin (IV) chloride, bis-butyltin dimethoxide, dimethyl-bis[1-oxonedecyl)oxy]stannane, di-n-octyltin bis-isooctyl mercaptoacetate; amine catalysts such as triethylenediamine, triethylamine, tributylamine, 1,4-diaza(2,2,2)bicyclooctane, tetramethylbutane diamine, bis[2-dimethylaminoethyl] ether, N,N-dimethylaminopropylamine, N,N-dimethylcyclohexylamine, N,N,N',N',N"-pentamethyldiethylenetriamine, diethanolamine, dimethtlethanolamine, N-[2-(dimethylamino)ethyl]-N-methylethanolamine, N-ethylmorpholine, 3-dimethylamino-N,N-dimethylpropionamide, and N,N',N"-dimethylaminopropylhexahydrotriazine; organic acids such as oleic acid and acetic acid; delayed catalysts; and mixtures thereof. Zirconium-based catalysts such as, for example, bis(2-dimethyl aminoethyl) ether; mixtures of zinc complexes and amine compounds such as KKAT™ XK 614, available from King Industries; and amine catalysts such as Niax™ A-2 and A-33, available from Momentive Specialty Chemicals, Inc. are particularly preferred. The catalyst is preferably added in an amount sufficient to catalyze the reaction of the components in the reactive mixture. In one embodiment, the catalyst is present in an amount from about 0.001 percent to about 1 percent, and preferably 0.1 to 0.5 percent, by weight of the composition.

In one preferred embodiment, as described above, water is used as the foaming agent—the water reacts with the polyisocyanate compound(s) and forms carbon dioxide gas which induces foaming of the mixture. The reaction rate of the water and polyisocyanate compounds affects how quickly the foam is formed as measured per reaction profile properties such as cream time, gel time, and rise time of the foam.

Fillers.

The foam composition may contain fillers such as, for example, mineral filler particulate. Suitable mineral filler particulates include compounds such as zinc oxide, limestone, silica, mica, barytes, lithopone, zinc sulfide, talc, calcium carbonate, magnesium carbonate, clays, powdered metals and alloys such as bismuth, brass, bronze, cobalt, copper, iron, nickel, tungsten, aluminum, tin, precipitated hydrated silica, fumed silica, mica, calcium metasilicate, barium sulfate, zinc sulfide, lithopone, silicates, silicon carbide, diatomaceous earth, carbonates such as calcium or magnesium or barium carbonate, sulfates such as calcium or magnesium or barium sulfate. Adding fillers to the composition provides many benefits including helping improve the stiffness and strength of the composition. The mineral fillers tend to help decrease the size of the foam cells and increase cell density. The mineral fillers also tend to help improve the physical properties of the foam such as hardness, compression set, and tensile strength. More particularly, clay particulate fillers, such as Garamite® mixed mineral thixotropes and Cloisite® and Nanofil® nanoclays, commercially available from Southern Clay Products, Inc., and Nanomax® and Nanomer® nanoclays, commercially available from Nanocor, Inc may be used.

Surfactants.

The foam composition also may contain surfactants to stabilize the foam and help control the foam cell size and structure. In one preferred version, the foam composition includes silicone surfactant. In general, the silicone surfactant helps regulate the foam cell size and stabilizes the cell walls to prevent the cells from collapsing. As discussed above, the liquid reactants react to form the foam rapidly. The "liquid" foam develops into solid silicone foam in a relatively short period of time. If a silicone surfactant is not added, the gas-liquid interface between the liquid reactants and expanding gas bubbles may not support the stress. As a result, the cell window can crack or rupture and there can be cell wall drainage. In turn, the foam can collapse on itself. Adding a silicone surfactant helps create a surface tension gradient along the gas-liquid interface and helps reduce cell wall drainage. The silicone surfactant has a relatively low surface tension and thus can lower the surface tension of the foam. It is believed the silicone surfactant orients itself the foam cell walls and lowers the surface tension to create the surface tension gradient. Blowing efficiency and nucleation are supported by adding the silicone surfactant and thus more bubbles are created in the system. The silicone surfactant also helps create a greater number of smaller sized foam cells and increases the closed cell content of the foam due to the surfactant's lower surface tension. Thus, the cell structure in the foam is maintained as the as gas is prevented from diffusing out through the cell walls. Along with the decrease in cell size, there is a decrease in thermal conductivity. The resulting foam material also tends to have greater compression strength and modulus. These improved physical properties may be due to the increase in closed cell content and smaller cell size.

Properties of Polyurethane Foams

The polyurethane foam compositions of this invention have numerous chemical and physical properties making them suitable for core assemblies in golf balls. For example, there are properties relating to the reaction of the isocyanate and polyol components and blowing agent, particularly "cream time," "gel time," "rise time," "tack-free time," and "free-rise density." In general, cream time refers to the time period from the point of mixing the raw ingredients together to the point where the mixture turns cloudy in appearance or changes color and begins to rise from its initial stable state. Normally, the cream time of the foam compositions of this invention is within the range of about 20 to about 240 seconds. In general, gel time refers to the time period from the point of mixing the raw ingredients together to the point where the expanded foam starts polymerizing/gelling. Rise time generally refers to the time period from the point of mixing the raw ingredients together to the point where the reacted foam has reached its largest volume or maximum height. The rise time of the foam compositions of this invention typically is in the range of about 60 to about 360 seconds. Tack-free time generally refers to the time it takes for the reacted foam to lose its tackiness, and the foam compositions of this invention normally have a tack-free time of about 60 to about 3600 seconds. Free-rise density refers to the density of the resulting foam when it is allowed to rise unrestricted without a cover or top being placed on the mold.

The density of the foam is an important property and is defined as the weight per unit volume (typically, $g/cm^3$) and can be measured per ASTM D-1622. The hardness, stiffness, and load-bearing capacity of the foam are independent of the foam's density, although foams having a high density typically have high hardness and stiffness. Normally, foams having higher densities have higher compression strength. Surprisingly, the foam compositions used to produce the inner core of the golf balls per this invention have a relatively low density; however, the foams are not necessarily soft and flexible, rather, they may be relatively firm, rigid, or semi-rigid depending upon the desired golf ball properties. Tensile strength, tear-resistance, and elongation generally refer to the foam's ability to resist breaking or tearing, and these properties can be measured per ASTM D-1623. The durability of foams is important, because introducing fillers and other additives into the foam composition can increase the tendency of the foam to break or tear apart. In general, the tensile strength of the foam compositions of this invention is in the range of about 20 to about 1000 psi (parallel to the foam rise) and about 50 to about 1000 psi (perpendicular to the foam rise) as measured per ASTM D-1623 at 23° C. and 50% relative humidity (RH). Meanwhile, the flex modulus of the foams of this invention is generally in the range of about 5 to about 45 kPa as measured per ASTM D-790, and the foams generally have a compressive modulus of 200 to 50,000 psi.

In another test, compression strength is measured on an Instron machine according to ASTM D-1621. The foam is cut into blocks and the compression strength is measured as the force required for compressing the block by 10%. In general, the compressive strength of the foam compositions of this invention is in the range of about 100 to about 1800 psi (parallel and perpendicular to the foam rise) as measured per ASTM D-1621 at 23° C. and 50% relative humidity (RH). The test is conducted perpendicular to the rise of the foam or parallel to the rise of the foam. The Percentage (%) of Compression Set also can be used. This is a measure of the permanent deformation of a foam sample after it has been compressed between two metal plates under controlled time and temperature condition (standard—22 hours at 70° C. (158° F.)). The foam is compressed to a thickness given as a percentage of its original thickness that remained "set." Preferably, the Compression Set of the foam is less than ten percent (10%), that is, the foam recovers to a point of 90% or greater of its original thickness.

The foam compositions of this invention may be prepared using different methods. In one preferred embodiment, the method involves preparing a castable composition comprising a reactive mixture of a polyisocyanate, polyol, water, curing agent, surfactant, and catalyst. A motorized mixer can be used to mix the starting ingredients together and form a reactive liquid mixture. Alternatively, the ingredients can be manually mixed together. An exothermic reaction occurs when the ingredients are mixed together and this continues as the reactive mixture is dispensed into the mold cavities (otherwise referred to as half-molds or mold cups).

Diameter and Hardness of Core and Intermediate Layer Structure

The inner core preferably has a diameter in the range of about 0.100 to about 1.600 inches. For example, the inner core may have a diameter within a range of about 1.400 inches to about 1.580 inches. In another example, the inner core may have a diameter within a range of about 0.400 to about 1.400 inches. As far as the intermediate layer is concerned, it preferably has a thickness in the range of about 0.100 to about 0.750 inches. For example, the intermediate layer can have a thickness of about 0.15 to about 0.40 inches.

Golf balls made in accordance with this invention can be of any size, although the USGA requires that golf balls used in competition have a diameter of at least 1.68 inches. For play outside of USGA rules, the golf balls can be of a smaller size. Normally, golf balls are manufactured in accordance with USGA requirements and have a diameter in the range of about 1.68 to about 1.80 inches. There is no upper size limit so some golf balls, if desired, can be made having an overall diameter greater than 1.80 inches, for example, 1.90 or 2.10, or 2.60 or 3.20 inches or 3.50 inches or even greater. Preferably, the golf ball diameter is about 1.68 to 1.74 inches, more preferably about 1.68 to 1.70 inches. As discussed above, the golf ball contains a cover that may be multi-layered and also may contain intermediate layers, so the thickness levels of these layers also must be considered. In general, the dual-core structure has an overall diameter within a range having a lower limit of about 1.00 or 1.20 or 1.30 or 1.40 inches and an upper limit of about 1.55 or 1.58 or 1.60 or 1.63 or 1.65 inches. In one embodiment, the diameter of the core sub-assembly is in the range of about 1.20 to about 1.60 inches. In another embodiment, the core sub-assembly has a diameter in the range of about 1.30 to about 1.58 inches, and in yet another version, the core diameter is about 1.40 to about 1.55 inches.

In general, hardness gradients are described in Bulpett et al., U.S. Pat. Nos. 7,537,529 and 7,410,429, the disclosures of which are hereby incorporated by reference. Methods for measuring the hardness of the inner core and outer core layers along with other layers in the golf ball and determining the hardness gradients of the various layers are described in further detail below. The core layers have positive, negative, or zero hardness gradients defined by hardness measurements made at the outer surface of the inner core (or outer surface of the intermediate layer) and radially inward towards the center of the inner core (or inner surface or midpoint of the intermediate layer). These measurements are made typically at 2-mm increments as described in the test methods below. In general, the hardness gradient is determined by subtracting the hardness value at the innermost portion of the component being measured (for example, the center of the inner core or inner surface or midpoint of the intermediate layer) from the hardness value at the outer surface of the component being measured (for example, the outer surface of the inner core or outer surface of the intermediate layer).

Positive Hardness Gradient.

For example, if the hardness value of the outer surface of the inner core is greater than the hardness value of the inner core's geometric center (that is, the inner core has a surface harder than its geometric center), the hardness gradient will be deemed "positive" (a larger number minus a smaller number equals a positive number.) For example, if the outer surface of the inner core has a hardness of 67 Shore C and the geometric center of the inner core has a hardness of 60 Shore C, then the inner core has a positive hardness gradient of 7. Likewise, if the outer surface of the intermediate layer has a greater hardness value than the inner surface (or midpoint) of the intermediate layer, the given intermediate layer will be considered to have a positive hardness gradient.

Negative Hardness Gradient.

On the other hand, if the hardness value of the outer surface of the inner core is less than the hardness value of the inner core's geometric center (that is, the inner core has a surface softer than its geometric center), the hardness gradient will be deemed "negative." For example, if the outer surface of the inner core has a hardness of 68 Shore C and the geometric center of the inner core has a hardness of 70 Shore C, then the inner core has a negative hardness gradient of 2. Likewise, if the outer surface of the intermediate layer has a lesser hardness value than the inner surface (or midpoint) of the intermediate layer, the given intermediate layer will be considered to have a negative hardness gradient.

Zero Hardness Gradient.

In another example, if the hardness value of the outer surface of the inner core is substantially the same as the hardness value of the inner core's geometric center (that is, the surface of the inner core has about the same hardness as the geometric center), the hardness gradient will be deemed "zero." For example, if the outer surface of the inner core and the geometric center of the inner core each has a hardness of 65 Shore C, then the inner core has a zero hardness gradient. Likewise, if the outer surface of the intermediate layer has a hardness value approximately the same as the inner surface (or midpoint) of the intermediate layer, the intermediate layer will be considered to have a zero hardness gradient.

More particularly, the term, "positive hardness gradient" as used herein means a hardness gradient of positive 1 Shore C or greater, preferably 3 or 7 Shore C or greater, more preferably 10 Shore C, and even more preferably 20 Shore C or greater. The term, "zero hardness gradient" as used herein means a hardness gradient of less than 1 Shore C and may have a value of zero or negative 1 to negative 10 Shore C. The term, "negative hardness gradient" as used herein means a hardness value of less than zero, for example, negative 3, negative 5, negative 7, negative 10, negative 15, or negative 20 or negative 25. The terms, "zero hardness gradient" and "negative hardness gradient" may be used herein interchangeably to refer to hardness gradients of negative 1 to negative 10.

The inner core preferably has a geometric center hardness ($H_{inner\ core\ center}$) of about 20 Shore D or greater. For example, the ($H_{inner\ core\ center}$) may be in the range of about 20 to about 80 Shore D and more particularly within a range having a lower limit of about 20 or 22 or 26 or 30 or 34 or 36 or 38 or 42 or 48 or 50 or 52 Shore D and an upper limit of about 54 or 56 or 58 or 60 or 62 or 64 or 68 or 70 or 74 or 76 or 78 or 80 Shore D. In another example, the center hardness of the inner core ($H_{inner\ core\ center}$), as measured in Shore C units, is preferably about 30 Shore C or greater; for example, the $H_{inner\ core\ center}$ may have a lower limit of about 30 or 34 or 37 or 40 or 44 Shore C and an upper limit of about 46 or 48 or 50 or 51 or 53 or 55 or 58 or 61 or 62 or 65 or 68 or 71 or 74 or 76 or 78 or 79 or 80 or 84 or 90 or 95 Shore C.

Concerning the outer surface hardness of the inner core ($H_{inner\ core\ surface}$), this hardness is preferably about 20 Shore D or greater; for example, the $H_{inner\ core\ surface}$ may fall within a range having a lower limit of about 20 or 25 or 28 or 30 or 32 or 34 or 36 or 40 or 42 or 48 or 50 and an upper limit of about 54 or 55 or 58 or 60 or 63 or 65 or 68 or 70 or 74 or 78 or 80 or 82 or 85 Shore D. In one version, the outer surface hardness of the inner core ($H_{inner\ core\ surface}$), as measured in Shore C units, has a lower limit of about 30 or 32 or 35 or 38 or 40 or 42 Shore C and an upper limit of about 45 or 48 or 50 or 53 or 56 or 58 or 60 or 62 or 65 or 68 or 70 or 74 or 78 or 80 or 86 or 90 or 95 Shore C. In one version, the geometric center hardness ($H_{inner\ core}$ center) is in the range of about 30 Shore C to about 95 Shore C;

and the outer surface hardness of the inner core ($H_{inner\ core\ surface}$) is in the range of about 30 Shore C to about 95 Shore C.

On the other hand, the intermediate layer preferably has an outer surface hardness ($H_{outer\ surface\ of\ intermed.}$) of about 5 Shore D or greater, and more preferably within a range having a lower limit of about 5 or 10 or 12 or 15 or 18 or 20 or 24 or 30 and an upper limit of about 32 or 34 or 35 or 38 or 40 or 42 or 45 or 50 or 52 or 58 or 60 Shore D. The outer surface hardness of the intermediate layer ($H_{outer\ surface\ of\ intermed.}$), as measured in Shore C units, preferably has a lower limit of about 13 or 15 or 18 or 20 or 24 or 28 or 30 or 33 and an upper limit of about 35 or 37 or 38 or 40 or 42 or 44 or 48 or 50 or 52 or 55 or 60 Shore C.

And, the inner surface of the intermediate layer ($H_{inner\ surface\ of\ intermed.}$) or midpoint hardness of the intermediate layer ($H_{midpoint\ of\ intermed.}$), preferably has a hardness of about 4 Shore D or greater, and more preferably within a range having a lower limit of about 4 or 6 or 8 or 10 or 12 or 14 or 18 or 20 or 24 and an upper limit of about 30 or 34 or 38 or 40 or 44 or 46 or 52 Shore D. The inner surface hardness ($H_{inner\ surface\ of\ intermed.}$) or midpoint hardness ($H_{midpoint\ of\ intermed.}$) of the intermediate layer, as measured in Shore C units, preferably has a lower limit of about 10 or 12 or 14 or 17 or 20 or 22 or 24 Shore C, and an upper limit of about 28 or 30 or 35 or 38 or 40 or 42 or 45 or 48 or 52 or 55 Shore C.

The inner core/intermediate layer structure also has a hardness gradient across the entire structure. In one embodiment, the ($H_{inner\ core\ center}$) is in the range of about 30 to about 95 Shore C, preferably about 45 to about 75 Shore C; and the ($H_{outer\ surface\ of\ intermediate\ layer}$) is in the range of about 13 to about 60 Shore C, preferably about 20 to about 50 Shore C to provide a negative hardness gradient across the sub-assembly.

In another embodiment, the $H_{inner\ core\ center}$ is in the range of about 35 to about 55 Shore C and the $H_{outer\ surface\ of\ intermed.}$ is in the range of about 40 to about 60 Shore C to provide a positive hardness gradient across the sub-assembly. The gradient will vary based on several factors including, but not limited to, the dimensions of the inner core and intermediate layers.

The outer surface hardness of the foamed intermediate layer ($H_{outer\ surface\ of\ intermed.}$), as measured in Shore A units, preferably has a lower limit of about 30 or 35 or 38 or 40 or 44 or 48 and an upper limit of about 55 or 57 or 60 or 62 or 64 or 68 or 70 or 72 or 75 or 80 or 85 or 88 or 90 or 95 or 100. The inner surface hardness ($H_{inner\ surface\ of\ intermed.}$) or midpoint hardness ($H_{midpoint\ of\ intermed.}$) of the foamed intermediate layer, as measured in Shore A units, preferably has a lower limit of about 25 or 28 or 30 or 34 or 37 or 40 or 22 or 24 or 30 or 34 or 40 Shore A, and an upper limit of about 50 or 52 or 55 or 58 or 60 or 62 or 65 or 70 or 72 or 76 or 80 or 88 or 91 or 95 Shore A.

The midpoint of a layer is taken at a point equidistant from the inner surface and outer surface of the layer to be measured, most typically an outer core layer. Once one or more core layers surround a layer of interest, the exact midpoint may be difficult to determine, therefore, for the purposes of the present invention, the measurement of "midpoint" hardness of a layer is taken within plus or minus 1 mm of the measured midpoint of the layer.

Specific Gravity (Density) of Layers

In one embodiment, the specific gravity of the inner core ($SG_{inner}$) is greater than the inner, specific gravity of the foamed intermediate layer ($SG_{intermed.}$). The specific gravity (density) of the respective layers is an important property, because they affect the Moment of Inertia (MOI) of the ball. In one preferred embodiment, the inner core has a relatively high specific gravity ("$SG_{inner}$"). For example, the inner core may have a specific gravity within a range having a lower limit of about 0.60 or 0.64 or 0.66 or 0.70 or 0.72 or 0.75 or 0.78 or 0.80 or 0.82 or 0.85 or 0.88 or 0.90 g/cc and an upper limit of about or 0.95 or 1.00 or 1.05 or 1.10 or 1.14 or 1.20 or 1.25 or 1.30 or 1.36 or 1.40 or 1.42 or 1.48 or 1.50 or 1.60 or 1.66 or 1.70 1.75 or 2.00 g/cc. In a particularly preferred version, the inner core has a specific gravity of about 1.05 g/cc.

Meanwhile, the foamed intermediate layer preferably has a relatively low specific gravity ($SG_{intermed.}$). For example, the intermediate layer may have a specific gravity within a range having a lower limit of about 0.20 or 0.34 or 0.28 or 0.30 or 0.34 or 0.35 or 0.40 or 0.42 or 0.44 or 0.50 or 0.53 or 0.57 or 0.60 or 0.62 or 0.65 or 0.70 or 0.75 or 0.77 or 0.80 g/cc and an upper limit of about 0.82 or 0.85 or 0.88 or 0.90 or 0.95 or 1.00 or 1.10 or 1.15 or 1.18 or 1.25 g/cc or 1.32 or 1.35 or 1.38 or 1.42 or 1.45 or 1.48 or 1.50 or 1.52 or 1.56. In a particularly preferred version, the intermediate layer has a specific gravity of about 0.50 g/cc.

In a second embodiment, the specific gravity of the foamed Intermediate layer ($SG_{intermed.}$) is greater than the specific gravity of the inner core ($SG_{inner}$). In yet another preferred embodiment, the specific gravity of the foamed intermediate layer ($SG_{intermed.}$) is substantially equal to the specific gravity of the inner core ($SG_{inner}$).

When comparing the specific gravities of the layers, it is generally meant by the term, "specific gravity of the inner core" ("$SG_{inner}$"), it is generally meant the specific gravity of the inner core as measured at any point in the inner core layer. Likewise, by the term, "specific gravity of the intermediate layer" ("$SG_{intermed}$"), it is meant the specific gravity of the intermediate layer as measured at any point in the intermediate layer. However, it is recognized the specific gravity of the layers may vary at different particular points within the respective layers. Thus, there may be specific gravity gradients within the layers. For example, the midpoint region of the foamed composition comprising the intermediate layer may have a density in the range of about 0.25 to about 0.75 g/cc; while the outer skin of the foam composition (outer surface of the intermediate layer) may have a density in the range of about 0.75 to about 1.35 g/cc. These specific gravity gradients within the layers are discussed further below.

In general, the specific gravities of the respective pieces of an object affect the Moment of Inertia (MOI) of the object. The Moment of Inertia of a ball (or other object) about a given axis generally refers to how difficult it is to change the ball's angular motion about that axis. If the ball's mass is concentrated towards the center, less force is required to change its rotational rate, and the ball has a relatively low Moment of Inertia. In such balls, the center piece (that is, the inner core) has a higher specific gravity than the outer piece (that is, the outer core layer). In such balls, most of the mass is located close to the ball's axis of rotation and less force is needed to generate spin. Thus, the ball has a generally high spin rate as the ball leaves the club's face after making impact. Because of the high spin rate, amateur golfers may have a difficult time controlling the ball and hitting it in a relatively straight line. Such high-spin balls tend to have a side-spin so that when a golfer hook or slices the ball, it may drift off-course.

Conversely, if the ball's mass is concentrated towards the outer surface, more force is required to change its rotational rate, and the ball has a relatively high Moment of Inertia. In such balls, the center piece (that is, the inner core) has a lower specific gravity than the outer piece (that is, the outer core layer). That is, in such balls, most of the mass is located away from the ball's axis of rotation and more force is needed to generate spin. Thus, the ball has a generally low spin rate as the ball leaves the club's face after making impact. Because of the low spin rate, amateur golfers may have an easier time controlling the ball and hitting it in a relatively straight line. The ball tends to travel a greater distance which is particularly important for driver shots off the tee.

As described in Sullivan, U.S. Pat. No. 6,494,795 and Ladd et al., U.S. Pat. No. 7,651,415, the formula for the Moment of Inertia for a sphere through any diameter is given in the CRC Standard Mathematical Tables, 24th Edition, 1976 at 20 (hereinafter CRC reference). The term, "specific gravity" as used herein, has its ordinary and customary meaning, that is, the ratio of the density of a substance to the density of water at 4° C., and the density of water at this temperature is 1 g/cm$^3$.

The golf balls of this invention having the above-described core/intermediate layer constructions show both good resiliency and spin control. In the balls of this invention, the specific gravity of the inner core layer ($SG_{inner}$) is preferably greater than the specific gravity of the intermediate layer ($SG_{intermed.}$). Still, the overall density of the core is generally balanced. As discussed above, the non-foamed composition used to make the inner core has a relatively high specific gravity. However, the foamed composition used to make the surrounding intermediate layer is slightly positioned away from the center of the ball. Thus, the ball does not have a relatively high or low moment of inertia. Rather, the ball can be described as having a relative "medium moment of inertia."

The foam cores and resulting balls also have relatively high resiliency so the ball will reach a relatively high velocity when struck by a golf club and travel a long distance. In particular, the inner foam cores of this invention preferably have a Coefficient of Restitution (COR) of about 0.300 or greater; more preferably about 0.400 or greater, and even more preferably about 0.450 or greater. The resulting balls containing the core/intermediate layer constructions of this invention and cover of at least one layer preferably have a COR of about 0.700 or greater, more preferably about 0.730 or greater; and even more preferably about 0.750 to 0.810 or greater. Also, the foam intermediate layers preferably have a Soft Center Deflection Index ("SCDI") compression, as described in the Test Methods below, in the range of about 50 to about 190, and more preferably in the range of about 60 to about 170.

Specific Gravity Gradients

There are several different ways of creating a specific gravity gradient within the layers, particularly the foamed intermediate layer. These methods include, for example, the following: 1) The foam composition can be treated so that it includes a fully-foamed region and a partially or completely-collapsed foam outer region. The density of the collapsed foam region is greater than the density of the fully-foamed region. Heat can be used to partially-collapse the foamed outer region and make it denser. This method is described in further detail below. 2) Foams having an open cell morphology, where the cells walls are incomplete or contain small holes can be prepared. These foams can be soaked in one or more reactive liquids so the liquid permeates a portion of the foam and reacts to form a region of greater density. This region can be cured resulting in a layer having a density gradient. 3) Secondary blowing agents that can be activated by heat or over-molding of additional layers also can be used to create a density gradient.

In one embodiment, the method for making the core assembly (non-foamed inner core and surrounding foamed outer core layer) comprises the following steps. First, a non-foam composition is molded into an inner core structure. Secondly, a foam composition is molded into an intermediate layer structure. Then, the foamed intermediate layer is thermally or chemically-treated so as to at least partially-collapse the foam in the outer region. In some instances, the foam in the outer region is completely collapsed by this treatment.

Figure 5:
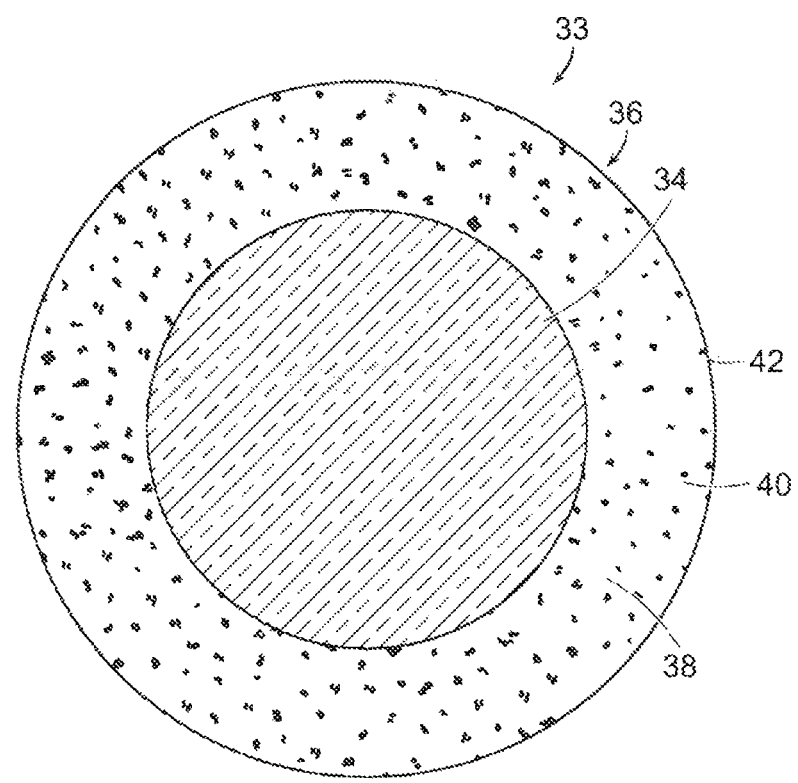
FIG. 5 is a is a cross-sectional view of a dual-core assembly including an inner core and surrounding outer core layer showing a foamed geometric midpoint, outer region, and outer surface skin in the outer core, the core assembly being made in accordance with the present invention.

Referring to FIG. 5, in one preferred embodiment, a ball sub-assembly (33) comprising an inner core (34) made from a non-foamed composition and an intermediate layer (36) made from a foamed composition, as described above, is shown. The foamed intermediate layer (36) includes a midpoint region (38) and surrounding outer surface region (40) and outer surface (42). When the intermediate layer (36) is first made, the midpoint region (38) and surrounding outer region (40) are foamed. The outer surface (42) of the intermediate layer is generally non-foamed and is a relatively thin and dense layer. This outer surface may be referred to as the "skin" of the foamed composition (intermediate layer). In one embodiment, the thickness of the outer skin (42) is in the range of about 0.001 inches (1 mil) to about 0.050 inches (50 mils) and preferably in the range of about 0.002 to about 0.030 inches and more preferably in the range of about 0.005 to about 0.015 inches. In one particular example, the thickness of the outer skin (42) can be less than about 0.025 inches and even less than 0.015 inches.

In a subsequent step, as described in further detail below, the foamed intermediate layer (36) is thermally or chemically-treated. For example, in one preferred embodiment, an inner cover layer is over-molded the intermediate layer. In this process, the heat used in the molding cycle activates/decomposes the foamed outer region (40) of the intermediate layer (36). This over-molding step causes the foamed outer region (40) of the outer core (36) to at least partially collapse. The foamed outer region (40) becomes at least partially non-foamed as the foam collapses. The outer region (40) becomes denser (that is, less foamed). In some instances, the foamed outer region (40) collapses completely and becomes completely non-foamed.

Figure 6:
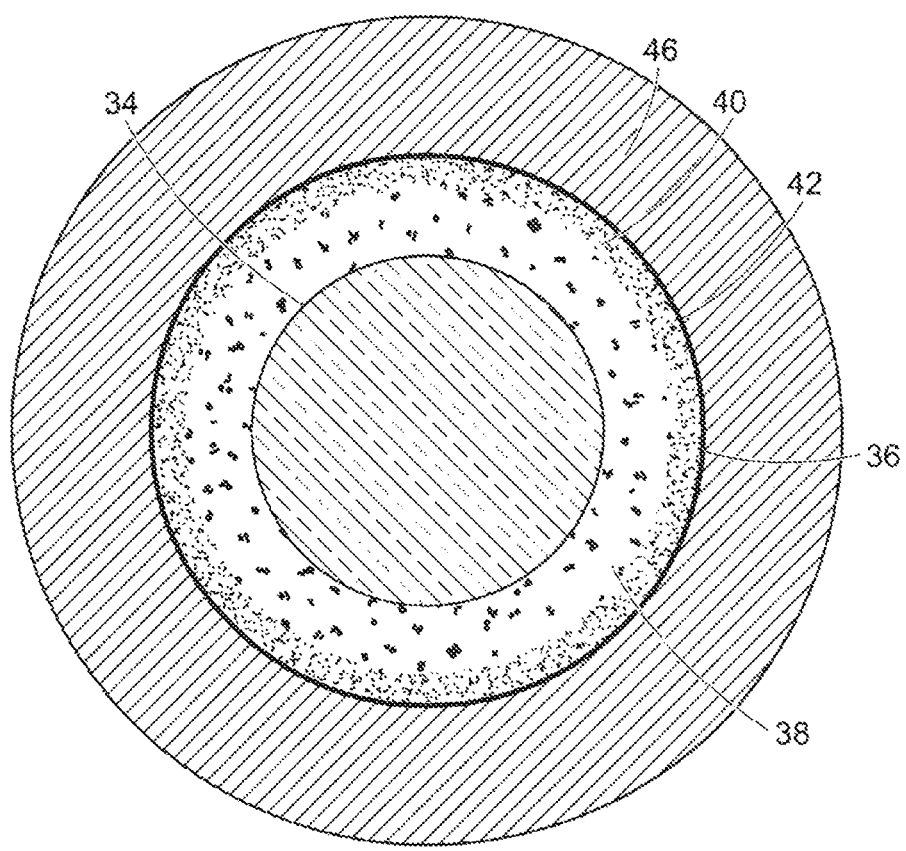
FIG. 6 is a is a cross-sectional view of a dual-core assembly including an inner core and surrounding outer core layer showing a foamed geometric midpoint, partially-collapsed foamed outer region, and outer surface skin; and a surrounding inner cover layer, the core assembly and inner cover being made in accordance with the present invention.

Referring to FIG. 6, the intermediate layer (36) is shown with a foamed midpoint region (38) and partially-collapsed outer region (40) and outer surface (skin) (42). A cover layer (46), which is formed by an over-molding process, surrounds the intermediate layer (36). In some instances, the foam in the outer region (40) is completely collapsed by this treatment. Meanwhile, the foamed state of the midpoint region (38) is maintained. The foamed geometric center, partially-collapsed outer region, and outer skin of the outer core layer have different morphologies. For example, there is generally lower volume of foam cells in the partially-collapsed outer region. A cover layer (46), which is formed by the over-molding process, surrounds the intermediate layer (36).

The cover layer (46) may be molded over the foamed outer core (36) using a variety of molding methods that involve subjecting the core (36) to heat and pressure. For example, the cover composition (46) (preferably a thermoplastic composition) may be This heat/pressure treatment creates a non-foamed outer region (40) having different properties than the foamed midpoint region (38) of the foamed intermediate layer (36). For example, in one preferred embodiment, the hardness of the outer region (40) is greater than the hardness of the midpoint region (38) to create a positive hardness gradient across the outer core layer (36). These hardness gradients are discussed in further detail below. The specific gravity (or density) of the outer region (40) also may be greater than the specific gravity of the midpoint region (38). That is, there can be specific gravity gradients within the foamed intermediate layer.

For example, the foamed intermediate layer (36) may have an outer surface specific gravity ($SG_{intermediate\ layer\ surface}$) and a midpoint specific gravity ($SG_{intermediate\ layer\ midpoint}$), wherein the $SG_{intermediate\ layer\ surface}$ is greater than the $SG_{intermediate\ layer\ midpoint}$. For example, the midpoint specific gravity can be within a range having a lower limit of about 0.20 or 0.24 or 0.28 or 0.30 or 0.34 or 0.35 or 0.40 or 0.42 or 0.44 or 0.50 or 0.53 or 0.57 or 0.60 or 0.62 or 0.65 or 0.70 or 0.75 or 0.77 or 0.80 and a higher limit of about 0.82 or 0.85 or 0.88 or 0.90 or 0.95 or 1.00 or 1.10 or 1.15 or 1.18 or 1.25 g/cc or 1.32 or 1.35 or 1.38 or 1.42 or 1.45 or 1.48 or 1.50 or 1.52 or 1.57 or 1.60. The foamed intermediate also has a specific gravity in the outer region ($SG_{intermediate\ layer\ outer\ region}$) and outer surface ($SG_{intermediate\ layer\ surface}$) as discussed above. For example, the specific gravity of the outer region and/or outer surface can be within a range having a lower limit of 0.21 or 0.35 or 0.29 or 0.31 or 0.35 or 0.36 or 0.41 or 0.43 or 0.45 or 0.51 or 0.54 or 0.58 or 0.61 or 0.63 or 0.66 or 0.71 or 0.76 or 0.78 or 0.81 g/cc and a higher limit of about 0.83 or 0.86 or 0.89 or 0.91 or 0.96 or 1.01 or 1.11 or 1.16 or 1.19 or 1.26 g/cc or 1.33 or 1.36 or 1.39 or 1.43 or 1.46 or 1.49 or 1.51 or 1.53 or 1.58 or 1.61.

In one preferred embodiment, the $SG_{intermediate\ layer\ surface}$ is greater than the $SG_{intermediate\ layer\ outer\ region}$ and the $SG_{intermediate\ layer\ outer\ region}$ is greater than the $SG_{intermediate\ layer\ midpoint}$. Thus, in one version, the $SG_{intermediate\ layer\ surface} > SG_{intermediate\ layer\ outer\ region} > SG_{intermediate\ layer\ midpoint}$ by at least 0.01, more preferably by at least 0.05, and most preferably by at least 0.1. In another preferred version, the $SG_{intermediate\ layer\ surface}$ is greater than or equal to $SG_{intermediate\ layer\ outer\ region}$ and is greater than the $SG_{intermediate\ layer\ midpoint}$ by at least 0.01, more preferably 0.05, and most preferably 0.1.

In an alternative method, a chemical-treatment may also be used to form an outer region of greater density in the intermediate layer (36). For example, the foamed sphere may be exposed to a solvent that partially dissolves or softens the outer portion of the sphere in order to cause it to collapse slightly. It is also possible to treat the foamed layer with a reactive mixture such as polyurethane, polyurea, epoxy, or other reactive polymer system. The liquid, non-reacted mixture can fill the voids of the outer region (40) of the foamed sphere and react to form a solid material. In this manner, the density of the outer region (40) of the foamed sphere can be increased.

As discussed above, the core of the golf ball of this invention preferably has a dual-layered construction comprising inner and outer core layers. The USGA has established a maximum weight of 45.93 g (1.62 ounces) for golf balls. For play outside of USGA rules, the golf balls can be heavier. Since the golf ball contains a cover and also may contain intermediate layers, the weight of these layers also must be considered. In one preferred embodiment, the weight of the dual-layered core is in the range of about 28 to about 42 grams.

Golf balls made in accordance with this invention can be of any size, although the USGA requires that golf balls used in competition have a diameter of at least 1.68 inches. For play outside of USGA rules, the golf balls can be of a smaller size. Normally, golf balls are manufactured in accordance with USGA requirements and have a diameter in the range of about 1.68 to about 1.80 inches. There is no upper size limit so some golf balls, if desired, can be made having an overall diameter greater than 1.80 inches, for example, 1.90 or 2.10, or 2.60 or 3.20 inches or 3.50 inches or even greater. Preferably, the golf ball diameter is about 1.68 to 1.74 inches, more preferably about 1.68 to 1.70 inches. In accordance with the present invention, the weight, diameter, and thickness of the core and cover layers may be adjusted, as needed, so the ball meets USGA specifications of a maximum weight of 1.62 ounces and a minimum diameter of at least 1.68 inches.

In yet other embodiments of this invention, the above-described compositions can be used to make golf balls having reduced distance while performing similar to traditional high performance balls in other ways. That is, in these embodiments, the golf ball has high playing performance properties such as flight trajectory, spin rate, and feel, except the ball plays a shorter distance than traditional high performance balls.

For example, in one preferred embodiment, golf ball constructions as described in Sullivan et al., U.S. Pat. No. 8,152,656 (the '656 Patent), the disclosure of which is hereby incorporated by reference, can be made. Such a ball preferably has a weight from 1.30 to 1.620 ounces, a diameter from 1.670 to 1.800 inches, and a maximum Coefficient of Restitution (CoR) from about 0.500 to about 0.790 as measured at 125 ft/sec incoming ball velocity. More preferably the ball has a weight of from about 1.50 ounces to 1.60 ounces, a diameter of 1.680 to 1.720, inches, and a CoR of from about 0.625 to 0.775 as measured at 125 ft/sec incoming ball velocity. The ball has a drag to weight ratio of greater than 2.4 at a Reynolds number of about 207,000 and a spin ratio of about 0.095.

The '656 Patent also describes the reduced distance golf ball as having a relatively high coefficient of drag ($C_D$). In one embodiment, the $C_D$ is greater than 0.26 at a Reynolds number of 150000 and a spin rate of 3000 RPM, and greater than 0.29 at a Reynolds number of 120000 and a spin rate of 3000 RPM. Further, golf balls prepared according to the present invention may have a relatively high coefficient of lift ($C_L$). In one embodiment, the $C_L$ is greater than 0.21 at a Reynolds number of 150000 and a spin rate of 3000 RPM, and greater than 0.23 at a Reynolds number of 120000 and a spin rate of 3000 RPM.

In one embodiment, the golf ball has reduced flight distance while retaining the appearance of a normal trajectory that can be defined by two non-dimensional parameters that account for the lift, drag, size and weight of the ball. The coefficients are defined in in the following Equations: i) $C_{D/W} = F_{D/W}$, and ii) $C_{L/W} = F_{L/W}$.

A reduction in flight distance is attainable when a golf ball's size, weight, dimple pattern and dimple profiles are selected to satisfy specific $C_{D/W}$ and $C_{L/W}$ criteria at specified combinations of Reynolds number and spin ratios (or spin rate), and the only other remaining variable is the COR. The size of the golf ball affects the lift and drag of the ball, since these forces are directly proportional to the surface area of the ball. The weight of the ball makes up the denominator of coefficients $C_{D/W}$ and $C_{L/W}$. Dimple patterns, for example, percentage of dimple coverage and geodesic patterns, can increase or decrease aerodynamic efficiency. Dimple profiles, e.g., edge angle, entry angle and shape (circular, polygonal), can increase or decrease the lift and/or drag experienced by the ball. According to the present invention, these factors can be selected or combined to yield desired $C_{D/W}$ and/or $C_{L/W}$ for a reduced distance golf ball that retains the appearance of a high performance trajectory.

Cover Structure

The golf ball sub-assemblies of this invention may be enclosed with one or more cover layers. The golf ball sub-assembly includes the core structure and one or more intermediate (mantle) layers disposed about the core. In one version, the golf ball includes a multi-layered cover comprising inner and outer cover layers. The inner cover layer is preferably formed from a composition comprising an ionomer or a blend of two or more ionomers that helps impart hardness to the ball.

Suitable ionomer compositions include partially-neutralized ionomers and highly-neutralized ionomers (HNPs), including ionomers formed from blends of two or more partially-neutralized ionomers, blends of two or more highly-neutralized ionomers, and blends of one or more partially-neutralized ionomers with one or more highly-neutralized ionomers. For purposes of the present disclosure, "HNP" refers to an acid copolymer after at least 70% of all acid groups present in the composition are neutralized.

Preferred ionomers are salts of O/X- and O/X/Y-type acid copolymers, wherein O is an α-olefin, X is a $C_3$-$C_8$ α,β-ethylenically unsaturated carboxylic acid, and Y is a softening monomer. O is preferably selected from ethylene and propylene. X is preferably selected from methacrylic acid, acrylic acid, ethacrylic acid, crotonic acid, and itaconic acid. Methacrylic acid and acrylic acid are particularly preferred. Y is preferably selected from (meth) acrylate and alkyl (meth) acrylates wherein the alkyl groups have from 1 to 8 carbon atoms, including, but not limited to, n-butyl (meth) acrylate, isobutyl (meth) acrylate, methyl (meth) acrylate, and ethyl (meth) acrylate.

Preferred O/X and O/X/Y-type copolymers include, without limitation, ethylene acid copolymers, such as ethylene/(meth)acrylic acid, ethylene/(meth)acrylic acid/maleic anhydride, ethylene/(meth)acrylic acid/maleic acid monoester, ethylene/maleic acid, ethylene/maleic acid mono-ester, ethylene/(meth)acrylic acid/n-butyl (meth)acrylate, ethylene/(meth)acrylic acid/iso-butyl (meth)acrylate, ethylene/(meth)acrylic acid/methyl (meth)acrylate, ethylene/(meth) acrylic acid/ethyl (meth)acrylate terpolymers, and the like. The term, "copolymer," as used herein, includes polymers having two types of monomers, those having three types of monomers, and those having more than three types of monomers. Preferred α,β-ethylenically unsaturated mono- or dicarboxylic acids are (meth) acrylic acid, ethacrylic acid, maleic acid, crotonic acid, fumaric acid, itaconic acid. (Meth) acrylic acid is most preferred. As used herein, "(meth) acrylic acid" means methacrylic acid and/or acrylic acid. Likewise, "(meth) acrylate" means methacrylate and/or acrylate.

In a particularly preferred version, highly neutralized E/X- and E/X/Y-type acid copolymers, wherein E is ethylene, X is a $C_3$-$C_8$ α,β-ethylenically unsaturated carboxylic acid, and Y is a softening monomer are used. X is preferably selected from methacrylic acid, acrylic acid, ethacrylic acid, crotonic acid, and itaconic acid. Methacrylic acid and acrylic acid are particularly preferred. Y is preferably an acrylate selected from alkyl acrylates and aryl acrylates and preferably selected from (meth) acrylate and alkyl (meth) acrylates wherein the alkyl groups have from 1 to 8 carbon atoms, including, but not limited to, n-butyl (meth) acrylate, isobutyl (meth) acrylate, methyl (meth) acrylate, and ethyl (meth) acrylate. Preferred E/X/Y-type copolymers are those wherein X is (meth) acrylic acid and/or Y is selected from (meth) acrylate, n-butyl (meth) acrylate, isobutyl (meth) acrylate, methyl (meth) acrylate, and ethyl (meth) acrylate. More preferred E/X/Y-type copolymers are ethylene/(meth) acrylic acid/n-butyl acrylate, ethylene/(meth) acrylic acid/methyl acrylate, and ethylene/(meth) acrylic acid/ethyl acrylate.

The amount of ethylene in the acid copolymer is typically at least 15 wt. %, preferably at least 25 wt. %, more preferably least 40 wt. %, and even more preferably at least 60 wt. %, based on total weight of the copolymer. The amount of $C_3$ to $C_8$ α,β-ethylenically unsaturated mono- or dicarboxylic acid in the acid copolymer is typically from 1 wt. % to 35 wt. %, preferably from 5 wt. % to 30 wt. %, more preferably from 5 wt. % to 25 wt. %, and even more preferably from 5 wt. % to 20 wt. %, based on total weight of the copolymer. The amount of optional softening comonomer in the acid copolymer is typically from 0 wt. % to 50 wt. %, preferably from 5 wt. % to 40 wt. %, more preferably from 10 wt. % to 35 wt. %, and even more preferably from 20 wt. % to 30 wt. %, based on total weight of the copolymer. "Low acid" and "high acid" ionomeric polymers, as well as blends of such ionomers, may be used. In general, low acid ionomers are considered to be those containing 16 wt. % or less of acid moieties, whereas high acid ionomers are considered to be those containing greater than 16 wt. % of acid moieties.

The various O/X, E/X, O/X/Y, and E/X/Y-type copolymers are at least partially neutralized with a cation source, optionally in the presence of a high molecular weight organic acid, such as those disclosed in Rajagopalan et al., U.S. Pat. No. 6,756,436, the entire disclosure of which is hereby incorporated herein by reference. The acid copolymer can be reacted with the optional high molecular weight organic acid and the cation source simultaneously, or prior to the addition of the cation source. Suitable cation sources include, but are not limited to, metal ion sources, such as compounds of alkali metals, alkaline earth metals, transition metals, and rare earth elements; ammonium salts and monoamine salts; and combinations thereof. Preferred cation sources are compounds of magnesium, sodium, potassium, cesium, calcium, barium, manganese, copper, zinc, lead, tin, aluminum, nickel, chromium, lithium, and rare earth metals. The amount of cation used in the composition is readily determined based on desired level of neutralization. As discussed above, for HNP compositions, the acid groups are neutralized to 70% or greater, preferably 70 to 100%, more preferably 90 to 100%. In one embodiment, an excess amount of neutralizing agent, that is, an amount greater than the stoichiometric amount needed to neutralize the acid groups, may be used. That is, the acid groups may be neutralized to 100% or greater, for example 110% or 120% or greater. In other embodiments, partially-neutralized compositions are prepared, wherein 10% or greater, normally 30% or greater of the acid groups are neutralized. When aluminum is used as the cation source, it is preferably used at low levels with another cation such as zinc, sodium, or lithium, since aluminum has a dramatic effect on melt flow reduction and cannot be used alone at high levels. For example, aluminum is used to neutralize about 10% of the acid groups and sodium is added to neutralize an additional 90% of the acid groups.

Ionic plasticizers such as organic acids or salts of organic acids, particularly fatty acids, may be added to the ionomer resin. Such ionic plasticizers are used to make conventional ionomer composition more processable as described in the above-mentioned U.S. Pat. No. 6,756,436. In the present invention such ionic plasticizers are optional. In one preferred embodiment, a thermoplastic ionomer composition is made by neutralizing about 70 wt % or more of the acid groups without the use of any ionic plasticizer. On the other hand, in some instances, it may be desirable to add a small amount of ionic plasticizer, provided that it does not adversely affect the heat-resistance properties of the composition. For example, the ionic plasticizer may be added in an amount of about 10 to about 60 weight percent (wt. %) of the composition, more preferably 30 to 55 wt. %.

The organic acids may be aliphatic, mono- or multi-functional (saturated, unsaturated, or multi-unsaturated) organic acids. Salts of these organic acids may also be employed. Suitable fatty acid salts include, for example, metal stearates, laureates, oleates, palmitates, pelargonates, and the like. For example, fatty acid salts such as zinc stearate, calcium stearate, magnesium stearate, barium stearate, and the like can be used. The salts of fatty acids are generally fatty acids neutralized with metal ions. The metal cation salts provide the cations capable of neutralizing (at varying levels) the carboxylic acid groups of the fatty acids. Examples include the sulfate, carbonate, acetate and hydroxide salts of metals such as barium, lithium, sodium, zinc, bismuth, chromium, cobalt, copper, potassium, strontium, titanium, tungsten, magnesium, cesium, iron, nickel, silver, aluminum, tin, or calcium, and blends thereof. It is preferred the organic acids and salts be relatively non-migratory (they do not bloom to the surface of the polymer under ambient temperatures) and non-volatile (they do not volatilize at temperatures required for melt-blending).

In a particular embodiment, the inner cover layer is formed from a composition comprising a high acid ionomer. A particularly suitable high acid ionomer is Surlyn 8150® (DuPont). Surlyn 8150® is a copolymer of ethylene and methacrylic acid, having an acid content of 19 wt %, which is 45% neutralized with sodium. In another particular embodiment, the inner cover layer is formed from a composition comprising a high acid ionomer and a maleic anhydride-grafted non-ionomeric polymer. A particularly suitable maleic anhydride-grafted polymer is Fusabond 525D® (DuPont). Fusabond 525D® is a maleic anhydride-grafted, metallocene-catalyzed ethylene-butene copolymer having about 0.9 wt % maleic anhydride grafted onto the copolymer. A particularly preferred blend of high acid ionomer and maleic anhydride-grafted polymer is an 84 wt %/16 wt % blend of Surlyn 8150® and Fusabond 525D®. Blends of high acid ionomers with maleic anhydride-grafted polymers are further disclosed, for example, in U.S. Pat. Nos. 6,992,135 and 6,677,401, the entire disclosures of which are hereby incorporated herein by reference.

The inner cover layer also may be formed from a composition comprising a 50/45/5 blend of Surlyn® 8940/Surlyn® 9650/Nucrel® 960, and, in a particularly preferred embodiment, the composition has a material hardness of from 80 to 85 Shore C. In yet another version, the inner cover layer is formed from a composition comprising a 50/25/25 blend of Surlyn® 8940/Surlyn® 9650/Surlyn® 9910, preferably having a material hardness of about 90 Shore C. The inner cover layer also may be formed from a composition comprising a 50/50 blend of Surlyn® 8940/Surlyn® 9650, preferably having a material hardness of about 86 Shore C. A composition comprising a 50/50 blend of Surlyn® 8940 and Surlyn® 7940 also may be used. Surlyn® 8940 is an E/MAA copolymer in which the MAA acid groups have been partially neutralized with sodium ions. Surlyn® 9650 and Surlyn® 9910 are two different grades of E/MAA copolymer in which the MAA acid groups have been partially neutralized with zinc ions. Nucrel® 960 is an E/MAA copolymer resin nominally made with 15 wt % methacrylic acid.

A wide variety of materials may be used for forming the outer cover including, for example, polyurethanes; polyureas; copolymers, blends and hybrids of polyurethane and polyurea; olefin-based copolymer ionomer resins (for example, Surlyn® ionomer resins and DuPont HPF® 1000 and HPF® 2000, commercially available from DuPont; Iotek® ionomers, commercially available from ExxonMobil Chemical Company; Amplify® IOionomers of ethylene acrylic acid copolymers, commercially available from The Dow Chemical Company; and Clarix® ionomer resins, commercially available from A. Schulman Inc.); polyethylene, including, for example, low density polyethylene, linear low density polyethylene, and high density polyethylene; polypropylene; rubber-toughened olefin polymers; acid copolymers, for example, poly(meth)acrylic acid, which do not become part of an ionomeric copolymer; plastomers; flexomers; styrene/butadiene/styrene block copolymers; styrene/ethylene-butylene/styrene block copolymers; dynamically vulcanized elastomers; copolymers of ethylene and vinyl acetates; copolymers of ethylene and methyl acrylates; polyvinyl chloride resins; polyamides, poly(amide-ester) elastomers, and graft copolymers of ionomer and polyamide including, for example, Pebax® thermoplastic polyether block amides, commercially available from Arkema Inc; cross-linked trans-polyisoprene and blends thereof; polyester-based thermoplastic elastomers, such as Hytrel®, commercially available from DuPont or RiteFlex®, commercially available from Ticona Engineering Polymers; polyurethane-based thermoplastic elastomers, such as Elastollan®, commercially available from BASF; synthetic or natural vulcanized rubber; and combinations thereof. Castable polyurethanes, polyureas, and hybrids of polyurethanes-polyureas are particularly desirable because these materials can be used to make a golf ball having high resiliency and a soft feel. By the term, "hybrids of polyurethane and polyurea," it is meant to include copolymers and blends thereof.

Polyurethanes, polyureas, and blends, copolymers, and hybrids of polyurethane/polyurea are also particularly suitable for forming cover layers. When used as cover layer materials, polyurethanes and polyureas can be thermoset or thermoplastic. Thermoset materials can be formed into golf ball layers by conventional casting or reaction injection molding techniques. Thermoplastic materials can be formed into golf ball layers by conventional compression or injection molding techniques.

The inner cover layer preferably has a material hardness within a range having a lower limit of 70 or 75 or 80 or 82 Shore C and an upper limit of 85 or 86 or 90 or 92 Shore C. The thickness of the inner cover layer is preferably within a range having a lower limit of 0.010 or 0.015 or 0.020 or 0.030 inches and an upper limit of 0.035 or 0.045 or 0.080 or 0.120 inches. The outer cover layer preferably has a material hardness of 85 Shore C or less. The thickness of the outer cover layer is preferably within a range having a lower limit of 0.010 or 0.015 or 0.025 inches and an upper limit of 0.035 or 0.040 or 0.055 or 0.080 inches. Methods for measuring hardness of the layers in the golf ball are described in further detail below.

As discussed above, the core/intermediate layer structure of this invention may be enclosed with one or more cover layers. In one embodiment, a multi-layered cover comprising inner and outer cover layers is formed, where the inner cover layer has a thickness of about 0.01 inches to about 0.06 inches, more preferably about 0.015 inches to about 0.040 inches, and most preferably about 0.02 inches to about 0.035 inches. In this version, the inner cover layer is formed from a partially- or fully-neutralized ionomer having a Shore D hardness of greater than about 55, more preferably greater than about 60, and most preferably greater than about 65. The outer cover layer, in this embodiment, preferably has a thickness of about 0.015 inches to about 0.055 inches, more preferably about 0.02 inches to about 0.04 inches, and most preferably about 0.025 inches to about 0.035 inches, with a hardness of about Shore D 80 or less, more preferably 70 or less, and most preferably about 60 or less. The inner cover layer is harder than the outer cover layer in this version. A preferred outer cover layer is a castable or reaction injection molded polyurethane, polyurea or copolymer, blend, or hybrid thereof having a Shore D hardness of about 40 to about 50. In another multi-layer cover, dual-core embodiment, the outer cover and inner cover layer materials and thickness are the same but, the hardness range is reversed, that is, the outer cover layer is harder than the inner cover layer. For this harder outer cover/softer inner cover embodiment, the ionomer resins described above would preferably be used as outer cover material.

Golf Ball Construction

The solid cores for the golf balls of this invention may be made using any suitable conventional technique such as, for example, compression or injection molding. In some embodiments, the inner core is formed by compression molding a slug of the uncured or lightly cured polybutadiene rubber material into a substantially spherical structure. The outer core layer, which surround the inner core, are formed by molding compositions over the inner core. Compression or injection molding techniques may be used. Then, the intermediate (mantle) and/or cover layers are applied. Prior to this step, the core structure may be surface-treated to increase the adhesion between its outer surface and the next layer that will be applied over the core. Such surface-treatment may include mechanically or chemically-abrading the outer surface of the core. For example, the core may be subjected to corona-discharge, plasma-treatment, silane-dipping, or other treatment methods known to those in the art.

The intermediate and cover layers are formed over the ball subassembly (core structure) using a suitable technique such as, for example, compression-molding, flip-molding, injection-molding, retractable pin injection-molding, reaction injection-molding, liquid injection-molding, casting, spraying, powder-coating, vacuum-forming, flow-coating, dipping, spin-coating, and the like. Preferably, each cover layer is separately formed over the ball subassembly. For example, an ethylene acid copolymer ionomer composition may be injection-molded to produce half-shells. Alternatively, the ionomer composition can be placed into a compression mold and molded under sufficient pressure, temperature, and time to produce the hemispherical shells. The smooth-surfaced hemispherical shells are then placed around the ball subassembly in a compression mold. Under sufficient heating and pressure, the shells fuse together to form an inner cover layer that surrounds the subassembly. In another method, the ionomer composition is injection-molded directly onto the core using retractable pin injection molding. An outer cover layer comprising a polyurethane or polyurea composition may be formed by using a casting process.

For example, in one version of the casting process, a liquid mixture of reactive polyurethane prepolymer and chain-extender (curing agent) is poured into lower and upper mold cavities. Then, the golf ball subassembly is lowered at a controlled speed into the reactive mixture. Ball suction cups can hold the ball subassembly in place via reduced pressure or partial vacuum. After sufficient gelling of the reactive mixture (typically about 4 to about 12 seconds), the vacuum is removed and the intermediate ball is released into the mold cavity. Then, the upper mold cavity is mated with the lower mold cavity under sufficient pressure and heat. An exothermic reaction occurs when the polyurethane prepolymer and chain extender are mixed and this continues until the cover material encapsulates and solidifies around the ball subassembly. Finally, the molded balls are cooled in the mold and removed when the molded cover is hard enough so that it can be handled without deformation.

In one such casting process, a polyurethane prepolymer and curing agent are mixed in a motorized mixer inside of a mixing head by metering amounts of the curative and prepolymer through the feed lines. A mold having upper and lower hemispherical-shaped mold cavities and with interior dimple patterns is used. Each mold cavity has an arcuate inner surface defining an inverted dimple pattern. The upper and lower mold cavities can be preheated and filled with the reactive polyurethane and curing agent mixture. After the reactive mixture has resided in the lower mold cavities for a sufficient time period, typically about 40 to about 100 seconds, the golf ball core/inner cover assembly can be lowered at a controlled speed into the reacting mixture. Ball cups can hold the assemblies by applying reduced pressure (or partial vacuum). After sufficient gelling (typically about 4 to about 12 seconds), the vacuum can be removed and the assembly can be released. Then, the upper half-molds can be mated with the lower half-molds. An exothermic reaction occurs when the polyurethane prepolymer and curing agent are mixed and this continues until the material solidifies around the subassembly. The molded balls can then be cooled in the mold and removed when the molded cover layer is hard enough to be handled without deforming. This molding technique is described in the patent literature including Hebert et al., U.S. Pat. No. 6,132,324, Wu, U.S. Pat. No. 5,334,673, and Brown et al., U.S. Pat. No. 5,006,297, the disclosures of which are hereby incorporated by reference.

As discussed above, the lower and upper mold cavities have interior dimple cavity details. When the mold cavities are mated together, they define an interior spherical cavity that forms the cover for the ball. The cover material encapsulates the inner ball subassembly to form a unitary, one-piece cover structure. Furthermore, the cover material conforms to the interior geometry of the mold cavities to form a dimple pattern on the surface of the ball. The mold cavities may have any suitable dimple arrangement such as, for example, icosahedral, octahedral, cube-octahedral, dipyramid, and the like. In addition, the dimples may be circular, oval, triangular, square, pentagonal, hexagonal, heptagonal, octagonal, and the like.

Figure 4:
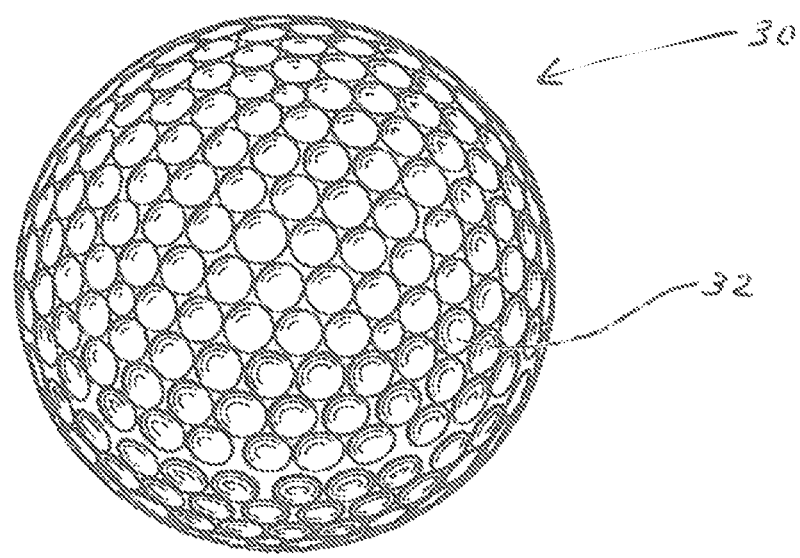
FIG. 4 is a perspective view of a finished golf ball made in accordance with the present invention.

After the golf balls have been removed from the mold, they may be subjected to finishing steps such as flash-trimming, surface-treatment, marking, coating, and the like using techniques known in the art. For example, in traditional white-colored golf balls, the white-pigmented cover may be surface-treated using a suitable method such as, for example, corona, plasma, or ultraviolet (UV) light-treatment. Then, indicia such as trademarks, symbols, logos, letters, and the like may be printed on the ball's cover using pad-printing, ink-jet printing, dye-sublimation, or other suitable printing methods. Clear surface coatings (for example, primer and top-coats), which may contain a fluorescent whitening agent, are applied to the cover. The resulting golf ball has a glossy and durable surface finish. In FIG. 4, a finished golf ball (30) having an outer cover with a dimpled surface (32) is shown.

In another finishing process, the golf balls are painted with one or more paint coatings. For example, white primer paint may be applied first to the surface of the ball and then a white top-coat of paint may be applied over the primer. Of course, the golf ball may be painted with other colors, for example, red, blue, orange, and yellow. As noted above, markings such as trademarks and logos may be applied to the painted cover of the golf ball. Finally, a clear surface coating may be applied to the cover to provide a shiny appearance and protect any logos and other markings printed on the ball.

Different core and ball constructions can be made per this invention as shown in FIGS. 1-6 discussed above. Such golf ball designs include, for example, three-piece, four-piece, five-piece, and six-piece designs. It should be understood that the core constructions and golf balls shown in FIGS. 1-6 are for illustrative purposes only and are not meant to be restrictive. Other core constructions and golf balls can be made in accordance with this invention.

Cores Having Three Layers

For example, multi-layered cores having an inner core, intermediate core layer, and outer core layer, wherein the intermediate core layer is disposed between the intermediate and outer core layers may be prepared in accordance with this invention. More particularly, as discussed above, the inner core may be constructed from a non-foamed thermoset or thermoplastic material, preferably polybutadiene rubber as discussed above. Meanwhile, the intermediate and outer core layers may be formed from foamed compositions, preferably foamed polyurethane as discussed above. In another embodiment, the inner core layer is formed from a a non-foamed thermoset or thermoplastic composition; the intermediate core layer is formed from a foamed composition; and the outer core layer is formed from a non-foamed thermoset or thermoplastic composition. The specific gravity of the core layer(s) comprising the foam composition is preferably less than the specific gravity of the core layer(s) comprising the non-foamed composition(s).

Where more than one foam layer is used in a single golf ball, the respective foamed chemical compositions may be the same or different, and the compositions may have the same or different hardness or specific gravity levels. For example, a golf ball may contain a three-layered core having a non-foamed polybutadiene rubber center; a polyurethane foam intermediate core layer; and an outer core layer comprising a foamed highly-neutralized ionomer (HNP) composition.

Test Methods

Hardness.

The center hardness of a core is obtained according to the following procedure. The core is gently pressed into a hemispherical holder having an internal diameter approximately slightly smaller than the diameter of the core, such that the core is held in place in the hemispherical portion of the holder while concurrently leaving the geometric central plane of the core exposed. The core is secured in the holder by friction, such that it will not move during the cutting and grinding steps, but the friction is not so excessive that distortion of the natural shape of the core would result. The core is secured such that the parting line of the core is roughly parallel to the top of the holder. The diameter of the core is measured 90 degrees to this orientation prior to securing. A measurement is also made from the bottom of the holder to the top of the core to provide a reference point for future calculations. A rough cut is made slightly above the exposed geometric center of the core using a band saw or other appropriate cutting tool, making sure that the core does not move in the holder during this step. The remainder of the core, still in the holder, is secured to the base plate of a surface grinding machine. The exposed 'rough' surface is ground to a smooth, flat surface, revealing the geometric center of the core, which can be verified by measuring the height from the bottom of the holder to the exposed surface of the core, making sure that exactly half of the original height of the core, as measured above, has been removed to within 0.004 inches. Leaving the core in the holder, the center of the core is found with a center square and carefully marked and the hardness is measured at the center mark according to ASTM D-2240. Additional hardness measurements at any distance from the center of the core can then be made by drawing a line radially outward from the center mark, and measuring the hardness at any given distance along the line, typically in 2 mm increments from the center. The hardness at a particular distance from the center should be measured along at least two, preferably four, radial arms located 180° apart, or 90° apart, respectively, and then averaged. All hardness measurements performed on a plane passing through the geometric center are performed while the core is still in the holder and without having disturbed its orientation, such that the test surface is constantly parallel to the bottom of the holder, and thus also parallel to the properly aligned foot of the durometer.

The outer surface hardness of a golf ball layer is measured on the actual outer surface of the layer and is obtained from the average of a number of measurements taken from opposing hemispheres, taking care to avoid making measurements on the parting line of the core or on surface defects, such as holes or protrusions. Hardness measurements are made pursuant to ASTM D-2240 "Indentation Hardness of Rubber and Plastic by Means of a Durometer." Because of the curved surface, care must be taken to ensure that the golf ball or golf ball subassembly is centered under the durometer indenter before a surface hardness reading is obtained. A calibrated, digital durometer, capable of reading to 0.1 hardness units is used for the hardness measurements. The digital durometer must be attached to, and its foot made parallel to, the base of an automatic stand. The weight on the durometer and attack rate conforms to ASTM D-2240.

In certain embodiments, a point or plurality of points measured along the "positive" or "negative" gradients may be above or below a line fit through the gradient and its outermost and innermost hardness values. In an alternative preferred embodiment, the hardest point along a particular steep "positive" or "negative" gradient may be higher than the value at the innermost portion of the inner core (the geometric center) or outer core layer (the inner surface)—as long as the outermost point (i.e., the outer surface of the inner core) is greater than (for "positive") or lower than (for "negative") the innermost point (i.e., the geometric center of the inner core or the inner surface of the outer core layer), such that the "positive" and "negative" gradients remain intact.

As discussed above, the direction of the hardness gradient of a golf ball layer is defined by the difference in hardness measurements taken at the outer and inner surfaces of a particular layer. The center hardness of an inner core and hardness of the outer surface of an inner core in a single-core ball or outer core layer are readily determined according to the test procedures provided above. The outer surface of the inner core layer (or other optional intermediate core layers) in a dual-core ball are also readily determined according to the procedures given herein for measuring the outer surface hardness of a golf ball layer, if the measurement is made prior to surrounding the layer with an additional core layer. Once an additional core layer surrounds a layer of interest, the hardness of the inner and outer surfaces of any inner or intermediate layers can be difficult to determine. Therefore, for purposes of the present invention, when the hardness of the inner or outer surface of a core layer is needed after the inner layer has been surrounded with another core layer, the test procedure described above for measuring a point located 1 mm from an interface is used. Likewise, the midpoint of a core layer is taken at a point equidistant from the inner surface and outer surface of the layer to be measured, most typically an outer core layer. It is recognized that when one or more core layers surround a layer of interest, the exact midpoint may be difficult to determine, therefore, for the purposes of the present invention, the measurement of "midpoint" hardness of a layer is taken within plus or minus 1 mm of the measured midpoint of the layer.

Also, it should be understood that there is a fundamental difference between "material hardness" and "hardness as measured directly on a golf ball." For purposes of the present invention, material hardness is measured according to ASTM D2240 and generally involves measuring the hardness of a flat "slab" or "button" formed of the material. Surface hardness as measured directly on a golf ball (or other spherical surface) typically results in a different hardness value. The difference in "surface hardness" and "material hardness" values is due to several factors including, but not limited to, ball construction (that is, core type, number of cores and/or cover layers, and the like); ball (or sphere) diameter; and the material composition of adjacent layers. It also should be understood that the two measurement techniques are not linearly related and, therefore, one hardness value cannot easily be correlated to the other. Shore hardness (for example, Shore A, Shore C or Shore D hardness) was measured according to the test method ASTM D-2240.

Compression.

As disclosed in Jeff Dalton's Compression by Any Other Name, Science and Golf IV, Proceedings of the World Scientific Congress of Golf (Eric Thain ed., Routledge, 2002) ("J. Dalton"), several different methods can be used to measure compression, including Atti compression, Riehle compression, load/deflection measurements at a variety of fixed loads and offsets, and effective modulus. For purposes of the present invention, compression refers to Soft Center Deflection Index ("SCDI"). The SCDI is a program change for the Dynamic Compression Machine ("DCM") that allows determination of the pounds required to deflect a core 10% of its diameter. The DCM is an apparatus that applies a load to a core or ball and measures the number of inches the core or ball is deflected at measured loads. A crude load/deflection curve is generated that is fit to the Atti compression scale that results in a number being generated that represents an Atti compression. The DCM does this via a load cell attached to the bottom of a hydraulic cylinder that is triggered pneumatically at a fixed rate (typically about 1.0 ft/s) towards a stationary core. Attached to the cylinder is an LVDT that measures the distance the cylinder travels during the testing timeframe. A software-based logarithmic algorithm ensures that measurements are not taken until at least five successive increases in load are detected during the initial phase of the test. The SCDI is a slight variation of this set up. The hardware is the same, but the software and output has changed. With the SCDI, the interest is in the pounds of force required to deflect a core x amount of inches. That amount of deflection is 10% percent of the core diameter. The DCM is triggered, the cylinder deflects the core by 10% of its diameter, and the DCM reports back the pounds of force required (as measured from the attached load cell) to deflect the core by that amount. The value displayed is a single number in units of pounds.

Drop Rebound.

By "drop rebound," it is meant the number of inches a sphere will rebound when dropped from a height of 72 inches in this case, measuring from the bottom of the sphere. A scale, in inches is mounted directly behind the path of the dropped sphere and the sphere is dropped onto a heavy, hard base such as a slab of marble or granite (typically about 1 ft wide by 1 ft high by 1 ft deep). The test is carried out at about 72-75° F. and about 50% RH Coefficient of Restitution ("COR").

The COR is determined according to a known procedure, wherein a golf ball or golf ball subassembly (for example, a golf ball core) is fired from an air cannon at two given velocities and a velocity of 125 ft/s is used for the calculations. Ballistic light screens are located between the air cannon and steel plate at a fixed distance to measure ball velocity. As the ball travels toward the steel plate, it activates each light screen and the ball's time period at each light screen is measured. This provides an incoming transit time period which is inversely proportional to the ball's incoming velocity. The ball makes impact with the steel plate and rebounds so it passes again through the light screens. As the rebounding ball activates each light screen, the ball's time period at each screen is measured. This provides an outgoing transit time period which is inversely proportional to the ball's outgoing velocity. The COR is then calculated as the ratio of the ball's outgoing transit time period to the ball's incoming transit time period (COR=$V_{out}/V_{in}$=$T_{in}/T_{out}$).

Density.

The density refers to the weight per unit volume (typically, g/cm$^3$) of the material and can be measured per ASTM D-1622.

The present invention is illustrated further by the following Examples, but these Examples should not be construed as limiting the scope of the invention.

EXAMPLES

In the following Examples, different compositions were used to prepare sample golf balls using the above-described molding methods. The different compositions and properties of the golf ball constructions are described in the Tables below.

Example A (Comparative)

A polybutadiene rubber composition was molded into a spherical core having a diameter of 1.530 inches. Then, an ethylene acid copolymer ionomer composition (Surlyn™, available from DuPont) was molded over the rubber core. The resulting intermediate ball (core and intermediate layer) had a diameter of 1.620 inches. Finally, an ethylene acid copolymer ionomer composition was molded over the intermediate ball to form a finished ball having a diameter of 1.680 inches.

Example 1

The same polybutadiene rubber composition used in Example A was molded into a spherical core having a diameter of 1.530 inches. Then, a foamed polyurethane composition having the formulation described in Table I below was molded over the rubber core. The resulting intermediate ball (core and intermediate layer) had a diameter of 1.620 inches.

TABLE I

Foamed Polyurethane Composition

| Ingredient | Weight Percent |
|---|---|
| 4,4 Methylene Diphenyl Diisocyanate (MDI) | 14.65% |
| Polyetratmethylene ether glycol (PTMEG 2000) | 34.92% |
| *Mondur ™ 582 (2.5 fn) | 29.11% |
| Trifunctional caprolactone polyol (CAPA 3031) (3.0 fn) | 20.22% |
| Water | 0.67% |
| **Niax ™ L-1500 surfactant | 0.04% |
| ***KKAT ™ XK 614 catalyst | 0.40% |
| Dibutyl tin dilaurate (T-12) | 0.03% |

*Mondur ™ 582 (2.5 fn)—polymeric methylene diphenyl diisocyanate (p-MDI) with 2.5 functionality, available from Bayer Material Science.
**Niax ™ L-1500 silicone-based surfactant, available from Momentive Specialty Chemicals, Inc.
***KKAT ™ XK 614 zinc-based catalyst, available from King Industries.

Finally, the same ethylene acid copolymer ionomer composition used in Example A was molded over the intermediate ball to form a finished ball having a diameter of 1.680 inches. The properties of the golf balls made in Examples A and 1 above are set forth in Table II below.

TABLE II

Properties of Finished Golf Balls

| Rubber Core | Rubber Core and Foamed Intermediate Layer | Comparative-Rubber Core and Surlyn Intermediate Layer | Finished Ball With Ionomer Outer Cover | Comparative-Finished Ball With Ionomer Outer Cover |
|---|---|---|---|---|
| 1.530" diameter | 1.620" diameter | 1.620" diameter | 1.680" diameter | 1.680" diameter |
| 35.83 gm. | 40.71 gm. | 41.25 gm | 45.73 gm | 44.93 gm |
| DCM-77 | DCM-70 | DCM-88 | DCM-80 | DCM-94 |
| — | 65 Shore C surface hardness | 94 Shore C surface hardness | 90 Shore C hardness | 94 Shore C surface hardness |
| CoR@ 125 ft./sec-0.793 | CoR@ 125 ft./sec-0.783 | CoR@ 125 ft./sec-0.812 | CoR@ 125 ft./sec-0.798 | CoR@ 125 ft./sec-0.819 |

It is understood that the golf ball compositions, constructions, and products described and illustrated herein represent only some embodiments of the invention. It is appreciated by those skilled in the art that various changes and additions can be made to compositions, constructions, and products without departing from the spirit and scope of this invention. It is intended that all such embodiments be covered by the appended claims.

We claim:

1. A multi-layered golf ball, comprising:
    i) an inner core comprising a non-foamed thermoset or thermoplastic composition, the inner core having a specific gravity ($SG_{inner}$) and an outer surface hardness ($H_{inner\ core\ surface}$) and a center hardness ($H_{inner\ core\ center}$), the $H_{inner\ core\ surface}$ being greater than the $H_{inner\ core\ center}$ to provide a positive hardness gradient;
    ii) an intermediate layer comprising a foamed thermoset composition, the intermediate layer being disposed about the core, the intermediate layer having a specific gravity ($SG_{intermed.}$) and an outer surface hardness ($H_{outer\ surface\ of\ intermed.}$) and a midpoint hardness ($H_{midpoint\ of\ intermed.}$), the $H_{outer\ surface\ of\ intermed.}$ being greater than the $H_{midpoint\ of\ intermed.}$, to provide a positive hardness gradient; wherein the $SG_{inner}$ is greater than the $SG_{intermed.}$, the intermediate layer further having a specific gravity gradient, wherein the intermediate layer has an outer surface specific gravity and a midpoint specific gravity, the outer surface specific gravity being greater than the midpoint specific gravity; and
    iii) a cover having at least one layer disposed about the intermediate layer.

2. The golf ball of claim 1, wherein the $H_{inner\ core\ center}$ is in the range of about 30 to about 90 Shore C and the $H_{inner\ core\ surface}$ is in the range of about 31 to about 95 Shore C.

3. The golf ball of claim 1, wherein the ($H_{midpoint\ of\ intermed.}$) is in the range of about 10 to about 55 Shore C and the $H_{outer\ surface\ of\ intermed.}$ is in the range of about 11 to about 60 Shore C.

4. The golf ball of claim 1, wherein the inner core has a diameter in the range of about 0.75 to about 1.60 inches and specific gravity in the range of about 0.60 to about 2.90 g/cc.

5. The golf ball of claim 1, wherein the inner core comprises a thermoset rubber selected from the group consisting of polybutadiene, ethylene-propylene rubber, ethylene-propylene-diene rubber, polyisoprene, styrene-butadiene rubber, polyalkenamers, and butyl rubber, and mixtures thereof.

6. The golf ball of claim 1, wherein the inner core comprises a thermoplastic polymer selected from the group consisting of partially-neutralized ionomers; highly-neutralized ionomers; polyesters; polyamides; polyamide-ethers, polyamide-esters; polyurethanes, polyureas; fluoropolymers; polystyrenes; polypropylenes; polyethylenes; polyvinyl chlorides; polyvinyl acetates; polycarbonates; polyvinyl alcohols; polyester-ethers; polyethers; polyimides, polyetherketones, polyamideimides; and mixtures thereof.

7. The golf ball of claim 1, wherein the intermediate layer comprises a foamed polyurethane composition.

8. The golf ball of claim 1, wherein the intermediate layer has a thickness in the range of about 0.025 to about 0.800 inches and specific gravity in the range of about 0.20 to about 1.20 g/cc.

9. A multi-layered golf ball, comprising:
    i) an inner core comprising a non-foamed thermoset or thermoplastic composition, the inner core having a specific gravity ($SG_{inner}$) and an outer surface hardness ($H_{inner\ core\ surface}$) and a center hardness ($H_{inner\ core\ center}$), the $H_{inner\ core\ surface}$ being greater than the $H_{inner\ core\ center}$ to provide a positive hardness gradient;
    ii) a first intermediate layer disposed about the core;
    iii) a second intermediate layer adjacent to the first intermediate layer;
    wherein at least one of the intermediate layers comprises a foamed thermoset composition and has a specific gravity ($SG_{intermed}$) and an outer surface hardness ($H_{outer\ surface\ of\ intermed}$) and a midpoint hardness ($H_{midpoint\ of\ intermed}$), the $H_{outer\ surface\ of\ intermed}$ being greater than the $H_{midpoint\ of\ intermed}$, to provide a positive hardness gradient; wherein the $SG_{inner}$ is greater than the $SG_{intermed}$, the intermediate layer further having a specific gravity gradient, wherein the intermediate layer has an outer surface specific gravity and a midpoint specific gravity, the outer surface specific gravity being greater than the midpoint specific gravity; and iv) a cover having at least one layer disposed about the intermediate layer.

10. The golf ball of claim 9, wherein one intermediate layer comprises the foamed thermoset composition and this intermediate layer is the first intermediate layer.

11. The golf ball of claim 9, wherein one intermediate layer comprises the foamed thermoset composition and this intermediate layer is the second intermediate layer.

12. The golf ball of claim 9, wherein the $H_{inner\ core\ center}$ is in the range of about 30 to about 90 Shore C and the $H_{inner\ core\ surface}$ is in the range of about 31 to about 95 Shore C.

13. The golf ball of claim 9, wherein the ($H_{midpoint\ of\ intermed.}$) is in the range of about 10 to about 55 Shore C and the $H_{outer\ surface\ of\ intermed.}$ is in the range of about 11 to about 60 Shore C.

14. The golf ball of claim 9, wherein the inner core comprises a thermoset rubber selected from the group consisting of polybutadiene, ethylene-propylene rubber, ethylene-propylene-diene rubber, polyisoprene, styrene-butadiene rubber, polyalkenamers, and butyl rubber, and mixtures thereof.

15. The golf ball of claim 9, wherein the inner core comprises a thermoplastic polymer selected from the group consisting of partially-neutralized ionomers; highly-neutralized ionomers; polyesters; polyamides; polyamide-ethers, polyamide-esters; polyurethanes, polyureas; fluoropolymers; polystyrenes; polypropylenes; polyethylenes; polyvinyl chlorides; polyvinyl acetates; polycarbonates; polyvinyl alcohols; polyester-ethers; polyethers; polyimides, polyetherketones, polyamideimides; and mixtures thereof.

16. The golf ball of claim 9, wherein the foamed thermoset composition is a foamed polyurethane composition.

17. A multi-layered golf ball, comprising:

i) an inner core comprising a non-foamed thermoset or thermoplastic composition, the inner core having a specific gravity ($SG_{inner}$) and an outer surface hardness ($H_{inner\ core\ surface}$) and a center hardness ($H_{inner\ core\ center}$), the $H_{inner\ core\ surface}$ being greater than the $H_{inner\ core\ center}$ to provide a positive hardness gradient;

ii) an intermediate layer comprising a foamed thermoplastic composition, the intermediate layer being disposed about the core, the intermediate layer having a specific gravity ($SG_{intermed.}$) and an outer surface hardness ($H_{outer\ surface\ of\ intermed.}$) and a midpoint hardness ($H_{midpoint\ of\ intermed.}$), the $H_{outer\ surface\ of\ intermed.}$ being greater than the $H_{midpoint\ of\ intermed.}$, to provide a positive hardness gradient; wherein the $SG_{inner}$ is greater than the $SG_{intermed.}$, the intermediate layer further having a specific gravity gradient, wherein the intermediate layer has an outer surface specific gravity and a midpoint specific gravity, the outer surface specific gravity being greater than the midpoint specific gravity; and iii) a cover having at least one layer disposed about the intermediate layer.

18. The multi-layered golf ball of claim 17, wherein, the foamed thermoplastic composition comprises a thermoplastic polymer selected from the group consisting of partially-neutralized ethylene acid copolymer ionomers; highly-neutralized ethylene acid copolymer ionomers; polyesters; polyamides; polyamide-ethers, polyamide-esters; polyurethanes, polyureas; fluoropolymers; polystyrenes; polypropylenes; polyethylenes; polyvinyl chlorides; polyvinyl acetates; polycarbonates; polyvinyl alcohols; polyester-ethers; polyethers; polyimides, polyetherketones, polyamideimides; and mixtures thereof.

19. The multi-layered golf ball of claim 17, wherein, the inner core comprises a non-foamed thermoplastic composition and the composition comprises a thermoplastic polymer is selected from the group consisting of partially-neutralized ethylene acid copolymer ionomers; highly-neutralized ethylene acid copolymer ionomers; and mixtures thereof.

* * * * *